US011813548B2

(12) United States Patent
Ballantyne et al.

(10) Patent No.: US 11,813,548 B2
(45) Date of Patent: Nov. 14, 2023

(54) EVAPORATOR FOR AMBIENT WATER BODIES, AND RELATED SYSTEM AND METHOD

(71) Applicant: RESOURCE WEST, INC., Grand Junction, CO (US)

(72) Inventors: Robert Ballantyne, Clifton, CO (US); William MacDonald, Grand Junction, CO (US)

(73) Assignee: Resource West, Inc., Grand Junction, CO (US)

( * ) Notice: Subject to any disclaimer, the term of this patent is extended or adjusted under 35 U.S.C. 154(b) by 323 days.

(21) Appl. No.: 16/386,866

(22) Filed: Apr. 17, 2019

(65) Prior Publication Data

US 2019/0314735 A1 Oct. 17, 2019

Related U.S. Application Data

(63) Continuation of application No. PCT/US2019/027389, filed on Apr. 12, 2019.
(Continued)

(51) Int. Cl.
*B01B 1/00* (2006.01)
*B01F 23/213* (2022.01)
(Continued)

(52) U.S. Cl.
CPC .......... *B01B 1/005* (2013.01); *B01F 23/2132* (2022.01); *B01F 33/503* (2022.01); *B01F 2101/305* (2022.01)

(58) Field of Classification Search
CPC ................. B01B 1/005; B01F 13/0049; B01F 13/04049; B01F 2215/0052
See application file for complete search history.

(56) References Cited

U.S. PATENT DOCUMENTS 2,682,925 A 7/1954 Wosika
3,584,792 A 6/1971 Johnson
(Continued)

FOREIGN PATENT DOCUMENTS

CN 1097680 C 1/2003
CN 101813070 A 8/2010
(Continued)

OTHER PUBLICATIONS

Adamson, A.W. et al. (1997) Physical Chemistry of Surfaces, Wiley-Interscience, 808 pgs [Office action cites 57 and 58].*
(Continued)

*Primary Examiner* — Brian A McCaig
(74) *Attorney, Agent, or Firm* — Stephen T. Sullivan, P.C.

(57) ABSTRACT

An evaporator is provided for evaporating water from an ambient body of water having a water surface. The evaporator includes a housing that has a proximal end proximate to the water surface, a distal end distal to the water surface, and a housing air flow channel directed toward the water surface. The housing is disposed on a support, such as a float assembly, that positions the housing above the water surface. The evaporator also includes an air flow induction device, preferably an impeller, disposed to direct an air flow stream from the distal end toward the proximal end through the housing air flow channel and toward the water surface so that the air contacts the water. The impeller preferably is made of a fiberglass material. The support preferably includes at least one float assembly air flow channel that receives the air flow stream from the housing and directs it outwardly from the evaporator. Water injection devices such as spray nozzles or atomizing nozzles preferably are disposed in the float assembly channel or channels to inject the water into the air flow stream.

24 Claims, 21 Drawing Sheets

Related U.S. Application Data

(60) Provisional application No. 62/656,856, filed on Apr. 12, 2018, provisional application No. 62/656,887, filed on Apr. 12, 2018, provisional application No. 62/656,906, filed on Apr. 12, 2018.

(51) Int. Cl.
*B01F 33/503* (2022.01)
*B01F 101/00* (2022.01)

(56) References Cited

U.S. PATENT DOCUMENTS

| | | | | |
|---|---|---|---|---|
| 3,610,527 | A | 10/1971 | Ericson | |
| 3,894,393 | A | 7/1975 | Carlson | |
| 3,920,230 | A | 11/1975 | Murphy | |
| 3,998,389 | A | 12/1976 | Rose | |
| 4,478,767 | A | 10/1984 | Watanabe | |
| 4,609,145 | A | 9/1986 | Miller | |
| 4,705,535 | A | 11/1987 | Lipp | |
| 4,742,682 | A | 5/1988 | Assaf et al. | |
| 4,801,811 | A | 1/1989 | Assaf et al. | |
| 5,487,659 | A | 1/1996 | Eroglu et al. | |
| 5,624,234 | A | 4/1997 | Neely et al. | |
| 6,086,053 | A | 7/2000 | Natschke et al. | |
| 6,182,463 | B1 | 2/2001 | Strussion et al. | |
| 6,190,498 | B1 | 2/2001 | Blagborne | |
| 6,244,821 | B1 | 6/2001 | Boyd et al. | |
| 6,386,830 | B1 | 5/2002 | Slipper et al. | |
| 8,833,092 | B1 * | 9/2014 | Sobhani | E03B 3/28<br>62/176.6 |
| 2002/0148222 | A1 | 10/2002 | Zaslavsky | |
| 2008/0054099 | A1 | 3/2008 | Giroux et al. | |
| 2008/0308955 | A1 | 12/2008 | Beckmann et al. | |
| 2015/0292522 | A1 | 10/2015 | Singh et al. | |
| 2017/0259283 | A1 | 9/2017 | Bird | |

FOREIGN PATENT DOCUMENTS

| | | | |
|---|---|---|---|
| EP | 0494380 | B1 | 7/1992 |
| EP | 2910772 | A1 | 9/2017 |
| ES | 2624312 | T3 | 1/2013 |
| KR | 200374502 | Y1 | 1/2005 |

OTHER PUBLICATIONS

National Advisory Committee for Aeronautics, Report No. 460, “The Characteristics of 78 Related Airfoil Sections From Tests in the Variable-Density Wind Tunnel,” 1935.

Wikipedia, “NACA Airfoil,” date unknown, retrieved Jan. 18, 2018.

Www.akiti.ca.com, “A Description of the NACA 4-Digit System,” date unknown, retrieved Jan. 18, 2018.

“The NACA Airfoil Series,” Author presently unknown, date presently unknown.

International Search Report for PCT Application No. PCT/2019/027384, dated Aug. 12, 2019.

International Search Report for PCT Application No. PCT/2019/027389, dated Aug. 8, 2019.

International Search Report for PCT Application No. PCT/2019/027391, dated Aug. 7, 2019.

U.S. Appl. No. 62/656,856, filed Apr. 12, 2018.

U.S. Appl. No. 62/656,887, filed Apr. 12, 2018.

U.S. Appl. No. 62/656,906, filed Apr. 12, 2018.

PCT Application No. PCT/US2019/027384, filed Apr. 12, 2019.

PCT Application No. PCT/US2019/027389, filed Apr. 12, 2019.

PCT Application No. PCT/US2019/027391, filed Apr. 12, 2019.

PCT Application No. PCT/US2019/027384, “ISR-384”.

PCT Application No. PCT/US2019/027389, “ISR-389”.

PCT Application No. PCT/US2019/027391, “ISR-391”.

* cited by examiner

EVAPORATOR FOR AMBIENT WATER BODIES, AND RELATED SYSTEM AND METHOD

CROSS-REFERENCES TO RELATED APPLICATIONS

This application claims priority and the benefit of earlier filing date to U.S. Provisional Application No. 62/656,856, No. 62/656,887, and No. 62/656,906, all of which were filed on Apr. 12, 2018. This application is a continuation of and also claims priority and the benefit of earlier filing date to PCT Application No. PCT/US19/27,389, filed on Apr. 12, 2019. The entire contents of each of these patent applications are hereby expressly incorporated herein by reference in their entirety as if fully set forth herein, including without limitation the specification or disclosure, claims, abstract, and all drawings, figures and tables thereof.

FIELD OF THE INVENTION

The present invention relates to evaporators and related components, systems and methods for evaporating water from an ambient body of water, for example, such a pond, lake, tank, or the like. This includes artificial water bodies, for example, as are commonly used in industrial applications such as oil and gas exploration, mining, waste water management and the like.

BACKGROUND OF THE INVENTION AND RELATED ART

There are many applications in which it is desirable or necessary to evaporate or dispose of water, often in substantial quantities, from an ambient water body, such as a pond, lake, tank, impoundment pond, flooded area, or the like. In a significant number of those applications, the water includes some form of impurity that precludes simple disposition of the water in another water body, such as the ocean, a river, stream or tributary. Impoundment ponds associated with an oil and gas drilling operation are an example. These ponds often contain high levels of dissolved solids or ions, possibly various forms of hydrocarbons, and so on.

A commonly-used approach to the disposal of the water in these water bodies involves physically transporting the water to a disposal site, such as an authorized injection well. Another approach that has been used involves evaporation. In this approach, the water is evaporated into the surrounding air so that the water itself evaporates but the impurities are left behind in the water body. Natural evaporation is of limited utility because the evaporation rate usually is extremely and in many cases unworkably slow. Evaporation devices have been employed that actively facilitate and speed up the evaporation process, for example, by spraying the water into the surrounding ambient air, or by entraining the water as droplets in a forced air stream directed above the water body.

Although this approach has met with substantial success, it is limited in some applications, for example, in that it can undesirably distribute not only the water but the impurities as well to areas outside the water body. Such approaches also can make it difficult to control the water droplet size, which has a direct bearing on such factors as droplet travel distance, evaporation kinetics, and so on. In addition, in some designs and applications the evaporation process is inefficient.

SUMMARY OF THE INVENTION

To address these limitations and to advance the art, and in accordance with the purposes of the invention as embodied and broadly described in this document, an evaporator is provided for evaporating water from an ambient body of water having a water surface. The evaporator comprises a housing comprising a proximal end proximate to the water surface, a distal end distal to the water surface, and a housing air flow channel directed toward the water surface. The evaporator also comprises a support that positions the housing above the water surface, and an air flow induction device disposed to direct an air flow stream from the distal end toward the proximal end through the housing air flow channel and toward the water surface so that the air contacts the water surface and generates a water droplet-containing phase above the water surface. Preferably, the housing is disposed relative to the water surface so that the air flow stream directly contacts the water surface and generates the water droplet containing phase above the water surface.

In presently-preferred embodiments, the support comprises a support air flow channel in fluid communication with the housing air flow channel to receive the air flow stream, or, often more preferably, the support comprises a plurality of support air flow channels in fluid communication with the housing air flow channel to receive the air flow stream.

In some presently-preferred embodiments, the evaporator further comprises a water injection device or a plurality of water injection devices disposed to provide the water to the air flow stream and to mix the water within the air in the air flow stream within the support air flow channel. The water injection device or devices may comprise a spray nozzle or an atomizing nozzle. The water injection devices preferably are distributed along the support air flow channel to provide water to the air flow stream within the support air flow channel.

In presently-preferred embodiments disclosed herein, the support comprises a plurality of support air flow channels in fluid communication with the housing air flow channel to receive the air flow stream, and the evaporator further comprises a plurality of water injection devices disposed to provide the water to the air flow stream within the support air flow channels and to mix the water within the air in the air flow stream.

The support air flow channel or channels comprise an exit from which the air flow stream is exhausted and, optionally but preferably, the evaporator further comprises at least one water injection device disposed at the support air flow channel exit to provide the water to the air flow stream and to mix the water within the air in the air flow stream.

The housing flow channel is disposed about a longitudinal axis and the flow channel has a diameter orthogonal to the longitudinal axis. Although sizes may vary, this diameter preferably but optionally is between about 36 and about 48 inches. In the illustrative but presently-preferred embodiments disclosed herein, the diameter is about 42 inches. In some embodiments, the housing air flow channel comprises a plurality of subchannels.

In many applications, the evaporator housing as indicated by its longitudinal axis is substantially perpendicular to the substantially planar water surface, but this is not necessarily limiting. Indeed, in accordance with an aspect of the invention, the housing may be disposed relative to the surface of the water so that it has a housing angle $\beta$ that can vary over a considerable range.

This range optionally but preferably includes angles of between 45 and 90 degrees with respect to the substantially planar surface of the water surface, and more preferably for some application of between 45 and 60 degrees.

The housing optionally but preferably comprises an inlet air gap within the housing air flow channel and proximate to the distal end of the housing that permits the flow of air into the housing air flow channel through the inlet air gap.

The air flow induction device comprises an impeller. Although not necessarily limiting, in accordance with another aspect of the invention, the air flow induction device or impeller comprises, and more preferably consists essentially of, a fiberglass material.

The evaporator also preferably comprises a plurality of guide vanes disposed downstream of the impeller or other air flow induction device. The guides vanes preferably are curved so that they decrease non-longitudinal air flow in the air flow stream with respect to the longitudinal axis of the evaporator, and more specifically its air flow channel.

The evaporator also preferably comprises a plurality of designated speeds. In many presently-preferred embodiments, it comprises an electric motor operatively coupled to the impeller to drive the impeller, and a controlled variable power supply operatively coupled to the motor that causes the motor to assume a plurality of designated speeds. A preferred example would comprise an electric motor operatively coupled to the impeller to drive the impeller, and a variable frequency drive operatively coupled to the motor.

In accordance with another aspect of the invention, an evaporator is provided for evaporating water from an ambient body of water having a water surface, wherein the evaporator comprises a housing comprising a housing air flow channel that directs an air flow stream toward an impact zone at the water surface. The housing flow channel comprises a proximal end proximate to the water surface and a distal end distal to the water surface. The evaporator also comprises a support that positions the housing above the water surface. The support comprises an opening at the impact zone. An air flow induction device is disposed to direct the air flow stream through the housing air flow channel and to the impact zone so that the air flow stream contacts the water surface at the impact zone and generates a water droplet-containing phase above the water surface.

The support comprises one or more support air flow channels in fluid communication with the housing air flow channel to receive the air flow stream and in fluid communication with the opening. It also preferably comprises one or more, and preferably a plurality, of water injection devices disposed to provide the water to the air flow stream and to mix the water within the air in the air flow stream in the support air flow channel or channels. These water injection devices may comprise a spray nozzle, an atomizing nozzle, or the like. The water injection devices preferably are distributed within the support air flow channel or channels to provide water to the air flow stream within the support air flow channel or channels. It also is preferred that at least some of the support air flow channels include an exit from which the air flow stream is exhausted, and that one or more water injection devices disposed at the support air flow channel exit to provide the water to the air flow stream and to mix the water within the air in the air flow stream at the air flow channel exit.

As noted herein above, it is preferred that the housing comprise an inlet air gap within the housing air flow channel and proximate to the distal end of the housing that permits the flow of air into the housing air flow channel through the inlet air gap.

The air flow induction devices, impellers and guide vanes described above also preferably are used in connection with this evaporator, as are the power control features noted herein above.

In accordance with another aspect of the invention, a method is provided for evaporating water from a body of water having a water surface. The method comprises providing an evaporator comprising a housing having a proximal end proximate to the water surface, a distal end distal to the water surface, and a housing air flow channel directed toward the water surface. The method also comprises directing air from the distal end of the housing toward the proximal end of the housing through the housing air flow channel and toward the water surface so the air contacts the water surface and generates a wet droplet-containing air phase above the water surface.

The method preferably includes directing the air through the housing flow channel using an impeller that comprises, and more preferably consists essentially of, a fiberglass material. In a presently-preferred implementation of this method, the air is directed through the housing flow channel using an impeller, preferably a fiberglass impeller, driven by a motor wherein the motor has a power rating of no more than 5 horsepower, and wherein the impeller produces a volumetric air flow rate within the housing flow channel of at least about 20,000 cubic feet per minute and wherein the impeller requires a torque of no more than about 22 pound-feet operating at about 1,200 RPM.

In accordance with yet another aspect of the invention, an evaporator is provided for evaporating water from a body of water having a water surface, wherein the evaporator comprises a housing having a proximal end proximal to the water surface, a distal end distal to the water surface, and a housing air flow channel directed toward the water surface. It also comprises a support that positions the housing above the water surface, and an impeller disposed to direct air from the distal end toward the proximal end through the housing air flow channel and toward the water surface so that the air contacts the water surface and generates a water droplet-containing air phase above the water surface.

BRIEF DESCRIPTION OF THE DRAWINGS

The accompanying drawings, which are incorporated in and constitute an integral part of the specification, illustrate presently-preferred embodiments and methods of the invention and, together with the general description given above and the detailed description of the preferred embodiments and methods given below, serve to explain the principles of the invention. Of the drawings.

DETAILED DESCRIPTION OF THE PREFERRED EMBODIMENTS AND METHODS

Figure 1:
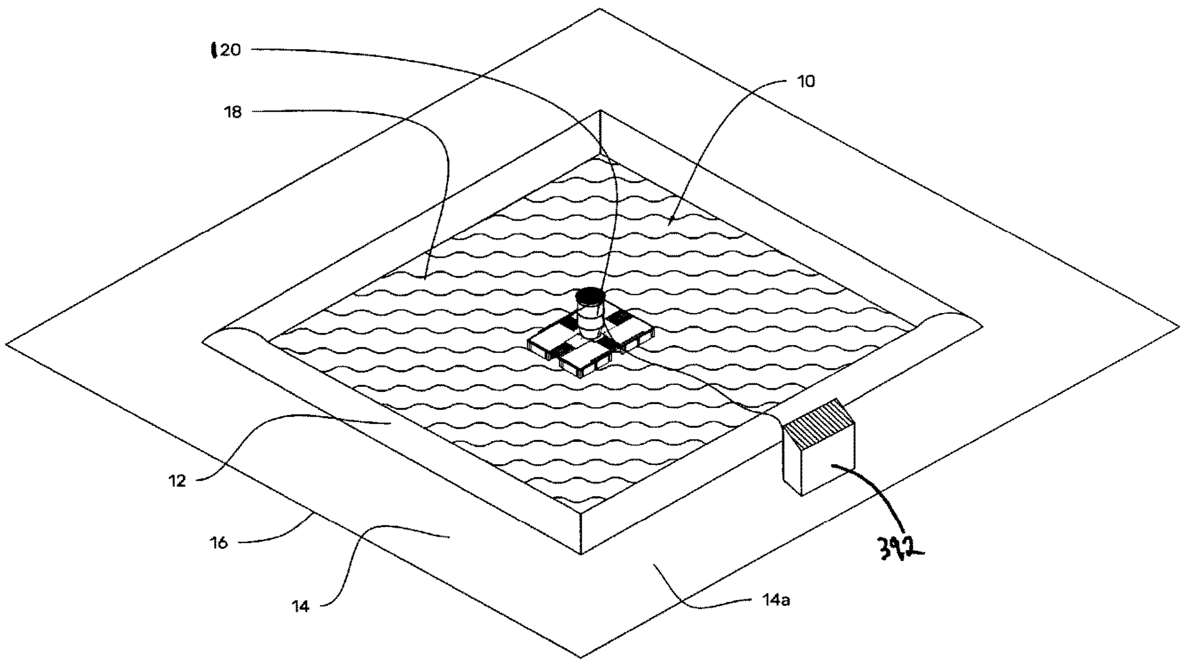
FIG. 1 is a perspective view of a water body, and more specifically an impoundment pond, in which an evaporator according to an aspect of the invention is positioned for operation.

Reference will now be made in detail to the presently-preferred embodiments and methods of the invention as illustrated in the accompanying drawings, in which like reference characters designate like or corresponding parts throughout the drawings. It should be noted, however, that the invention in its broader aspects is not limited to the specific details, representative devices and methods and illustrative examples shown and described in this section in connection with the preferred embodiments and methods. The invention according to its various aspects is particularly pointed out and distinctly claimed in the attached claims read in view of this specification, and appropriate equivalents.

Evaporators according to the various aspects and embodiments of the invention are useful for evaporating water from ambient water bodies, for example, such as ponds, lakes, reservoirs, rivers, tanks, impoundment ponds, flooded areas, and the like, as noted above. To provide an illustrative example, and with reference to FIG. 1, a water body 10 in the form of an impoundment pond is shown in perspective view. The pond 10 is of the type that is commonly found at or near oil and gas drilling sites, mining operations, food processing plants, and the like. It is surrounded at its perimeter by a berm or ledge 12. A plastic or other water-impermeable liner 14 is disposed on the bottom and side surfaces of the pond, over berm or ledge 12 and to an outer perimeter 16. Liner 14 thus retains water 18 within the pond and, by virtue of the liner portion surrounding the pond from the berm or ledge 12 to the outer perimeter, (referred to herein as an "apron **14*a***"), protects the ground from spills, pond overruns, and the like.

An evaporator 20, for example, according to any one of the various embodiments disclosed herein, is disposed on the surface **18*a* of the water 18 within the pond 10**, in this illustrative example roughly in the center of the pond.

In accordance with a presently-preferred implementation of a method according to an aspect of the invention, water is evaporated from a body of water which of course has a surface, i.e., the top surface of the water exposed to ambient air. Using the illustrative pond setting of FIG. 1, for example, the method would be used to evaporate water 18 from water body or pond 10 having a water surface **18*a***.

The method includes providing an evaporator comprising a housing. The housing includes a proximal end proximate to the water surface, a distal end distal to the water surface, and a housing air flow channel directed toward the water surface. The method also comprises directing air from the distal end of the housing downstream toward the proximal end of the housing through the housing flow channel and toward the water surface so the air contacts the water surface and generates a wet droplet-containing air phase above the water surface.

It may be noted that, in describing the preferred embodiments and methods in this document, it will be convenient to use the relative terms "upstream" and "downstream" to describe the flow or air within the devices, to describe the relative locations of device components and locations relative to one another along the air flow channels, to describe relative directions or movement, and so on. Accordingly, as used herein, the term "downstream" refers to the direction in which the bulk air flows within the device. With respect to the housing, bulk air flow is from the distal end to the proximal end and thus downwardly toward the surface of the water. With respect to the float assembly flow channels described herein, bulk air flow flows outwardly from the downstream end of the housing flow channel to the outer or exit end of the flow channel. Conversely, the term "upstream" means the direction opposite of downstream.

An illustrative implementation of this method will now be described in connection with an evaporator 120 according to a presently-preferred embodiment of another aspect of the invention. It should be noted, however, that the method is neither limited to this presently-preferred implementation nor to the use of evaporator 120, and that other implementations, evaporators, etc. may be used.

Figure 2:
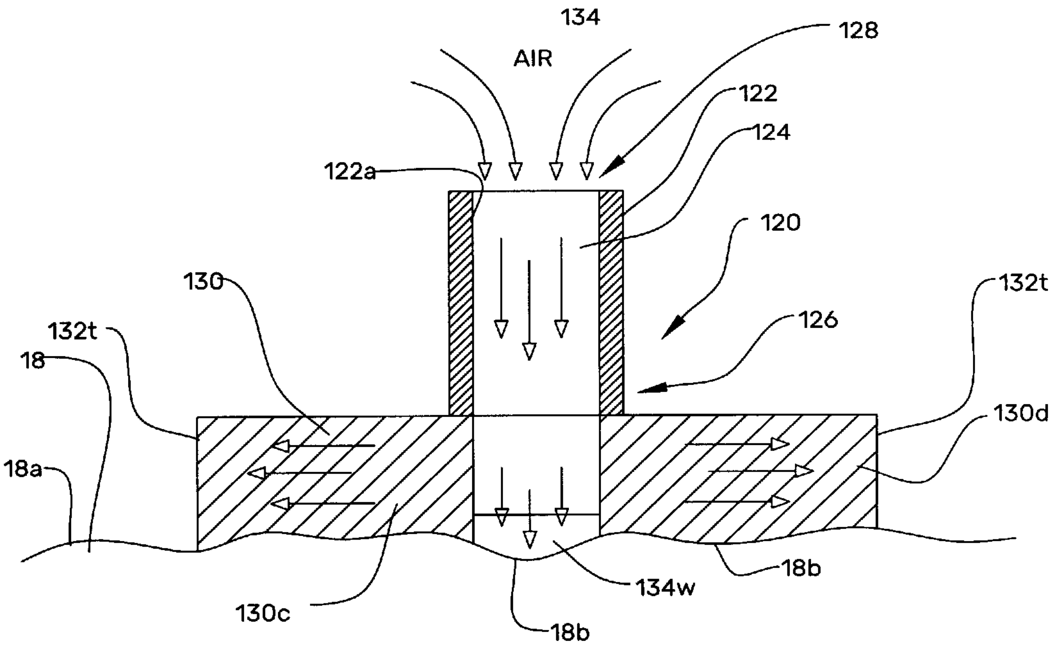
FIG. 2 is a side view of an evaporator in accordance with a presently-preferred embodiment of an aspect of the invention, also used here to illustrate a presently-preferred implementation of a method according to another aspect of the invention.
Figure 3:
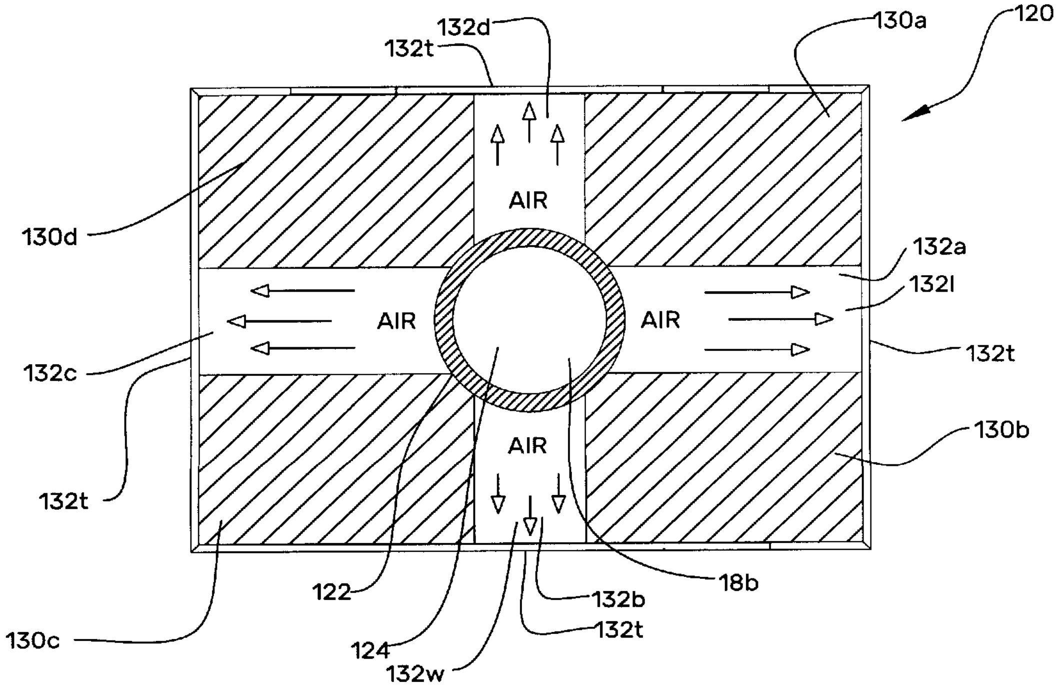
FIG. 3 is a top view of the evaporator shown in FIG. 2.

Evaporator 120 is shown in schematic form in FIGS. 2 and 3. It comprises a housing 122 disposed on the surface 18*a* of water body 10. The housing 122, and more specifically in this example, the interior volume of the housing, comprises a housing air flow channel 124.

Housing 122 has a proximal end 126 proximate to the water surface 18*a* and a distal end 128 distal to the water surface. Incidentally, the terms "proximal" and "distal" are used throughout this disclosure to refer to various components or portions of the embodiments and related methods discussed herein. These terms are used according to their conventional or general meaning but within the present context. "Proximal" refers to the portion or end of an item that is closer to a reference position or item (in this instance, the surface 18*a* of the water 18 in the water body 10), and "distal" refers to the portion or end of an item that is more distant relative to the reference position or item.

The housing 122 is fixedly disposed on and at the center of a support that comprises a float assembly 130. The float assembly 130 comprises four rectangular box-like floats 130*a-d*, each being substantially identical to the others. Floats 130*a-d* are fixedly spaced with respect to one another to form a larger substantially-rectangular platform that floats on the water surface 18*a*. The volumes between floats 130*a-d* comprise float assembly air flow channels 132*a-d* (also referred to herein as "float channels"). Each float channel is in fluid communication with housing air flow channel 124 at the proximal end 126 of housing air flow channel 124. A linear length-wise float channel 132-L is formed down the length of the float assembly by floats 130*a* and 130*d* on one side and floats 130*b* and 130*c* on the other. Similarly, a linear width-wise float channel 132-W substantially perpendicular to channel 132-L is formed by floats 132*a* and 132*b* on one side and floats 132*c* and *d* on the other. Each float assembly air flow channel ends at a terminus or exit 132*t*, from which the air flowing through the flow channel exits and flows to the surrounding ambient air directly over and along the surrounding water surface 18*a*.

In operation and according to this illustrative method implementation, ambient air 134 is drawn into housing air flow channel 124 from the distal end 128 of the housing 122. Given this entry location, typically the intake air will be relatively dryer and warmer than the air at or near the surface of the water 18*a*. The air is directed toward the proximal end 126 of the housing by an air flow induction device such as an impeller through the housing air flow channel 124 and toward the water surface 18*a*, i.e., downstream, so that the air contacts the water surface and generates a wet phase or water droplet-containing air phase above the water surface.

The invention according to its various aspects comprises various methods, approaches and embodiments for facilitating evaporation. One involves directing ambient air flow through the float channels in such a way that the moving air contacts the water surface and generates water droplets and water vapor in the process. The water droplets are then carried outwardly from the float channel exits and into the surrounding ambient air. The greatly-increased total surface area of the water attributable to the droplet formation can greatly increase the evaporation rate. Similarly and preferably within this approach, a water distribution system also may be used to spray or otherwise inject water into the air flow within float channels. This may be accomplished, as described herein below, by disposing water injecting devices such as nozzles within the float channels. Alternatively or in addition, water injecting devices may be disposed at the float channel exits so that the air flow is injected with water as it emerges from the float channels and as it initially mixes with the surrounding air.

Another approach to facilitate evaporation as disclosed herein involves generating droplets and a corresponding water droplet-containing air phase by directly impacting the air flow from the housing air flow channel onto the surface of the water. As disclosed more fully herein below, this method may be implemented by defining an impact zone on the water surface where the air flow stream from the proximate end of the housing flow channel exits the downstream end of housing air flow channel and impacts the water surface. The support or float assembly is designed to allow this impact, for example, by providing an opening at the impact zone that provides a fluidic path from the downstream end of the housing air flow channel to the water surface and, more specifically, to the impact zone, so that the air flow stream contacts the impact zone with sufficient velocity and momentum to generate the desired water droplets and water droplet-containing air phase. In the presently-preferred embodiments described herein below, this water droplet-containing air phase can then be carried outwardly away from the impact zone, for example, by directing it through the float channels and out the float channel exits. This direct impact method may be used as the sole or primary method for facilitating the evaporation, but preferably, combinations of these methods are employed and, more preferably, all of the methods are used at the same time and in the same evaporator.

The impact zone, an example of which is indicated in FIGS. 2 and 3 by reference numeral 18*b*, may comprise or consist essentially of the substantially circular zone or region directly downstream from the exit of the housing flow channel. Depending, for example, on the spacing of the housing flow channel exit relative to the water surface, the geometry of the housing flow channel exit, the use of vents or guide vanes at that exit and the like, and so on, the shape of the impact zone, however, may vary from this. The impact zone may be designed to have a larger area than the housing flow channel exit, for example, to facilitate the generation of more water droplets, to vary the size or size distribution of the water droplets, and so on.

Figure 4:
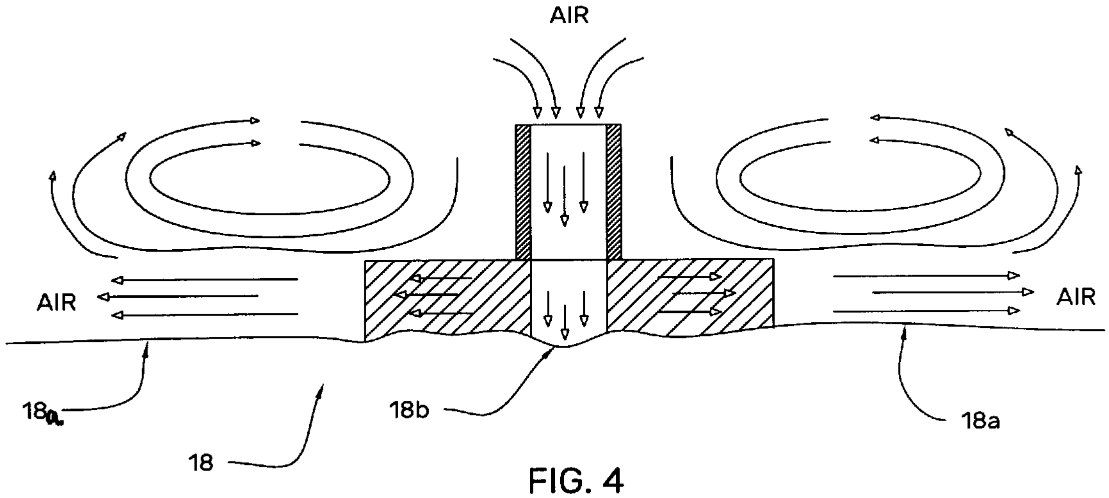
FIG. 4 is a side view of an evaporator according to presently-preferred embodiments of an aspect of the invention as disclosed herein, and is used here schematically to illustrate phenomenology associated with their operation.
Figure 5:
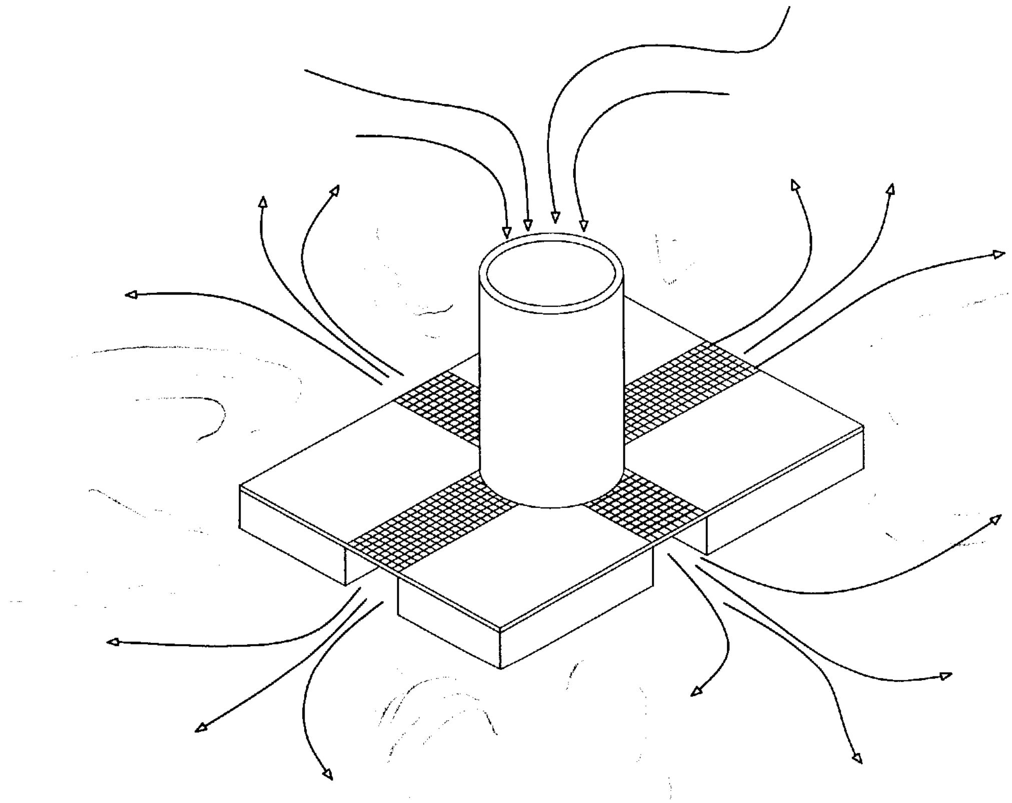
FIG. 5 is a perspective view of the evaporator shown in FIG. 4.

The water droplet-containing air phase preferably comprises water vapor-laden, and more preferably, saturated or supersaturated, air and small diameter water droplets. The water droplets may be sized according to designs and features as disclosed herein so that they have a suitably small diameter or principal dimension to provide high total effective surface area to facilitate evaporation With reference to FIGS. 4 and 5, the air flow from the float assembly channels 132*a-d* causes wet or water droplet-containing air phase 134*w* to be projected out away from the evaporator along the water surface 18*a*, where it is exposed to relatively dryer air and where water within this phase can more readily evaporate. This wet air phase flow along the water surface also can facilitate evaporation of surface water 18*a*, e.g., by interfering with or removing the boundary layer presence and enhancing the partial pressure of water vapor at the water surface combined with the Brownian motion or molecular diffusion from the bulk water or water surface 18*a* into the air above it. As the wet air phase flow proceeds along the surface of the water, typically it will eventually develop turbulent eddies that will cause the wet air to rise away from the water surface 18*a*. In addition, the flow of air out of the float channels and adjacent to the surface of the water will cause ambient air above and around this air stream to be drawn into and along the main exit stream emerging from the float channels, and a plurality of currents typically will arise around and above the main air flow streams out of the float channels, e.g., as shown in FIGS. 4 and 5. This will increase mixing of the wet air with the surrounding ambient air, which typically will be dryer and warmer than the wet air stream. These phenomena can be and often are enhanced by local or micro-meteorological conditions, e.g., such as wind, solar radiation from sunlight (insolation), and the like. These effects increase the probability that a water molecule in the water droplet will complete a phase change from liquid to gas. This can continue until the air reaches the wet bulb temperature and thus maximize or optimize the evaporative efficiency.

Methods according to this aspect of the invention can allow the evaporator to process substantial volumes of water into airborne water vapor and water droplets to facilitate evaporation, but can avoid high vertical plumes and disadvantages associated with them.

Such methods also can include varying or otherwise controlling air flow characteristics through the flow channels, e.g., such as air flow velocity, air flow rate, and so on.

Further illustrations of the method are discussed or will be gleaned from the further descriptions herein below.

Figure 6:
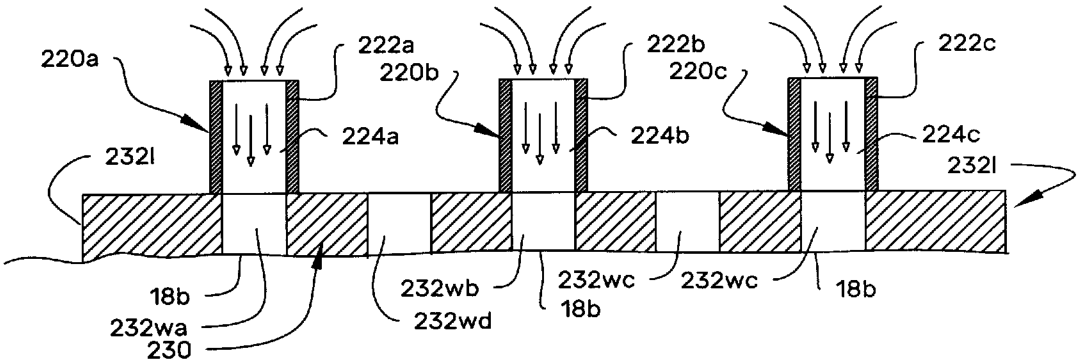
FIG. 6 is a side view of an evaporator according to another presently-preferred embodiment of an aspect of the invention, and includes multiple evaporator units on a single or unitary flotation assembly.
Figure 7:
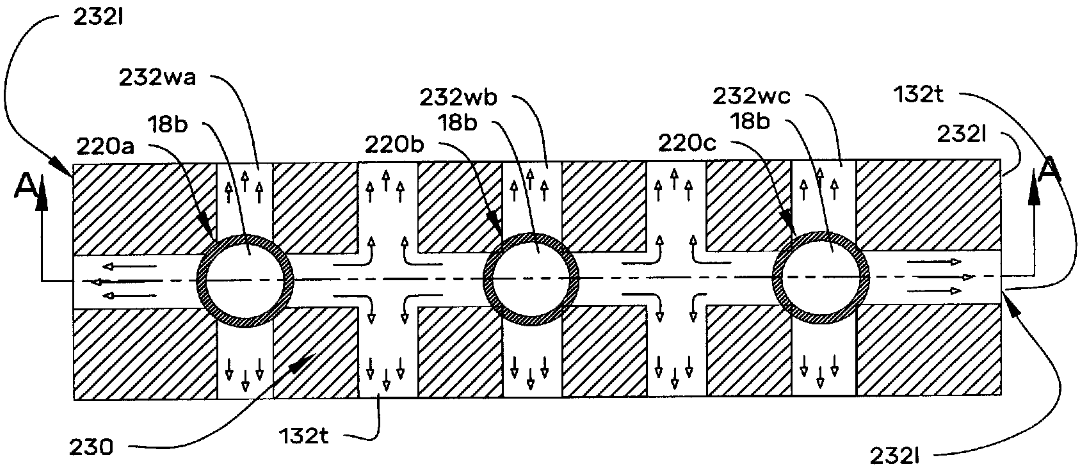
FIG. 7 is a top view of the evaporator shown in FIG. 6.

Methods according to this aspect of the invention, as noted herein, of course are not limited to the illustrative embodiment shown in FIGS. 2 and 3. A multiple-evaporator system 220, for example, is shown in FIGS. 6 and 7. System 220 comprises three evaporators or evaporator units 220*a, b* and *c* disposed on the top surface of a rectangular float assembly 230. Each of the evaporator units 220*a-c* is the same in its essential design and features as evaporator 120 of FIGS. 2 and 3. As shown in the side view of FIG. 6, which is viewed from the perspective of arrows A-A in FIG. 7, each of the evaporators comprises a housing 222*a-c*, respectively, each with a housing air flow channel 224*a-c*, respectively. Each housing flow channel is in fluid communication with a continuous float assembly length flow channel 232-L and a corresponding float assembly width flow channel 232-*wa-wc*. In this illustrative embodiment, intermediate float assembly width flow channels 232-*wd* and 232-*we* are included, e.g., to further facilitate the flow of air out of the float assembly channels. The length flow channel 232-L is in continuous along the length of the float assembly, and each float assembly width channel is fluidically coupled to length flow channel 232-L. With this configuration, each of the housing air flow channels 224*a-c* is in fluidic communication with length flow channel 232-L and at least the adjacent width flow channels.

In operation, the individual evaporator units 220*a-c* draw ambient air from distal end 228 of each evaporator and force it through the respective housing flow channels 224*a-c* and float assembly flow channels 232. This generates a wet air phase or water droplet-containing phase within the float channels and at the outlet for each float channel, as described above.

This embodiment may and preferably does include the direct impact method of generating water droplets. Thus, each housing flow channel and each float assembly section would be configured to provide an impact zone below each housing flow channel exit. Optionally but preferably, a water distribution system would be provided within the float channels and at each float channel exit to inject additional water into the air flow stream.

Figure 8:
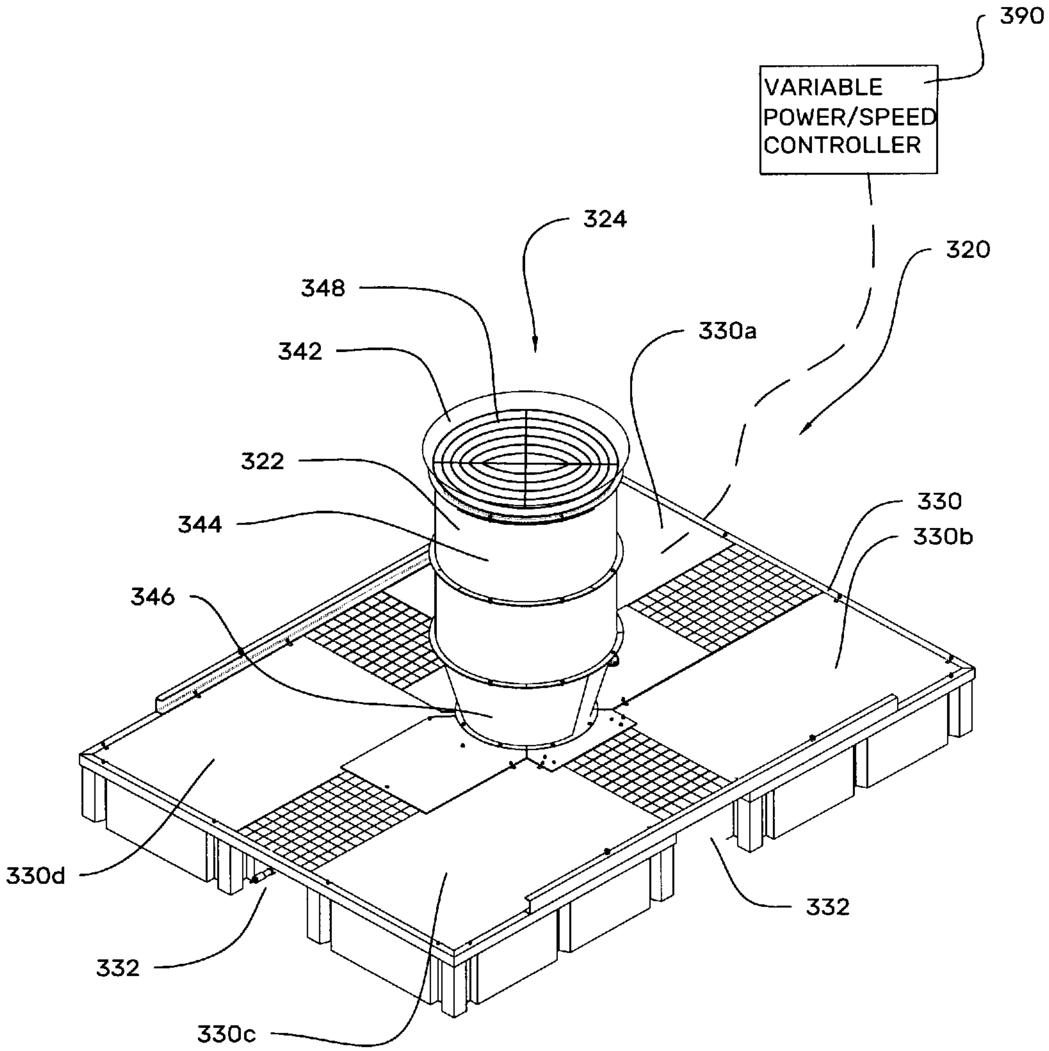
FIG. 8 is a perspective view of an evaporator according to another presently-preferred embodiment of an aspect of the invention.
Figure 9:
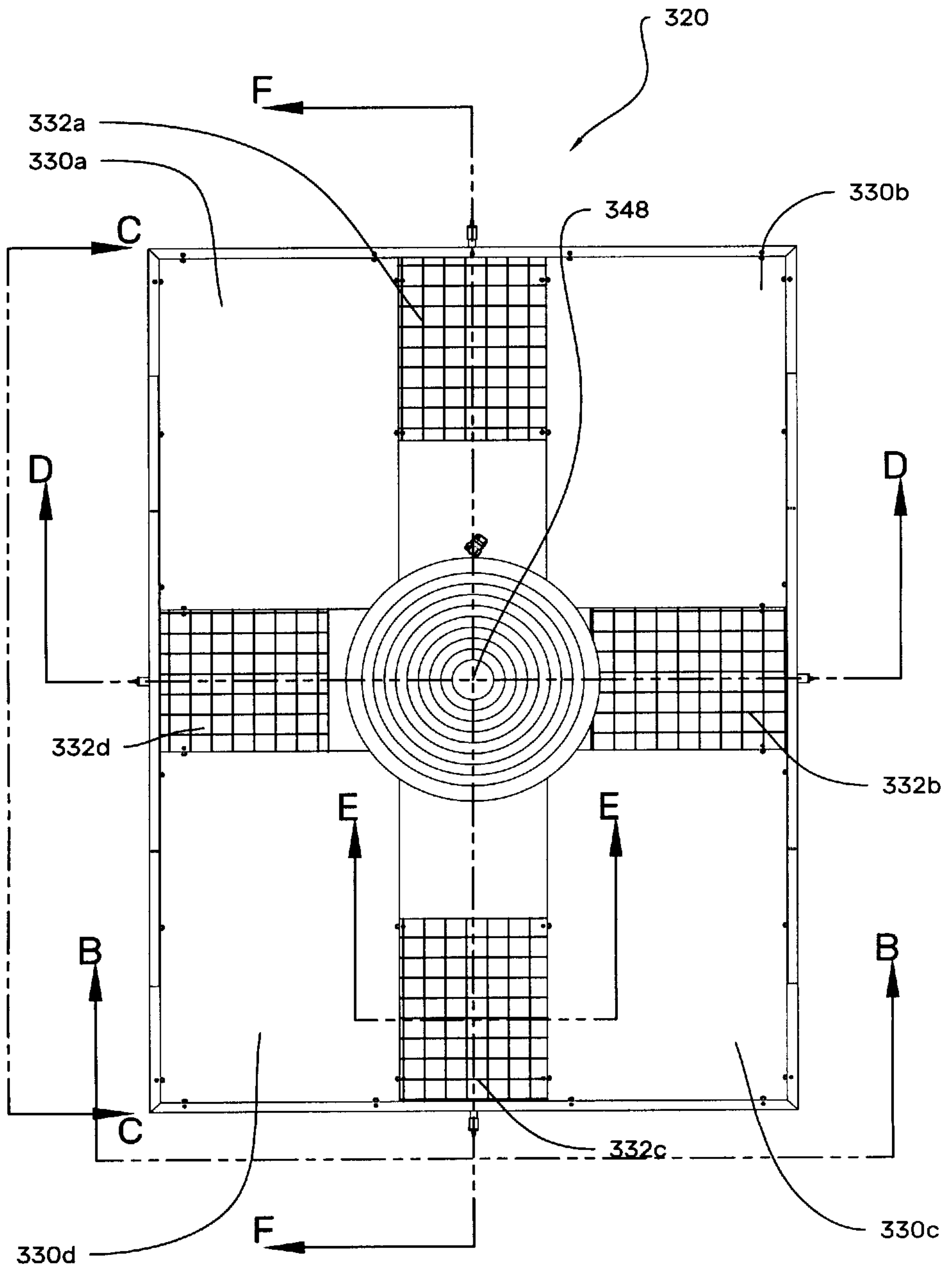
FIG. 9 is a top view of the evaporator shown in FIG. 8.
Figure 10:
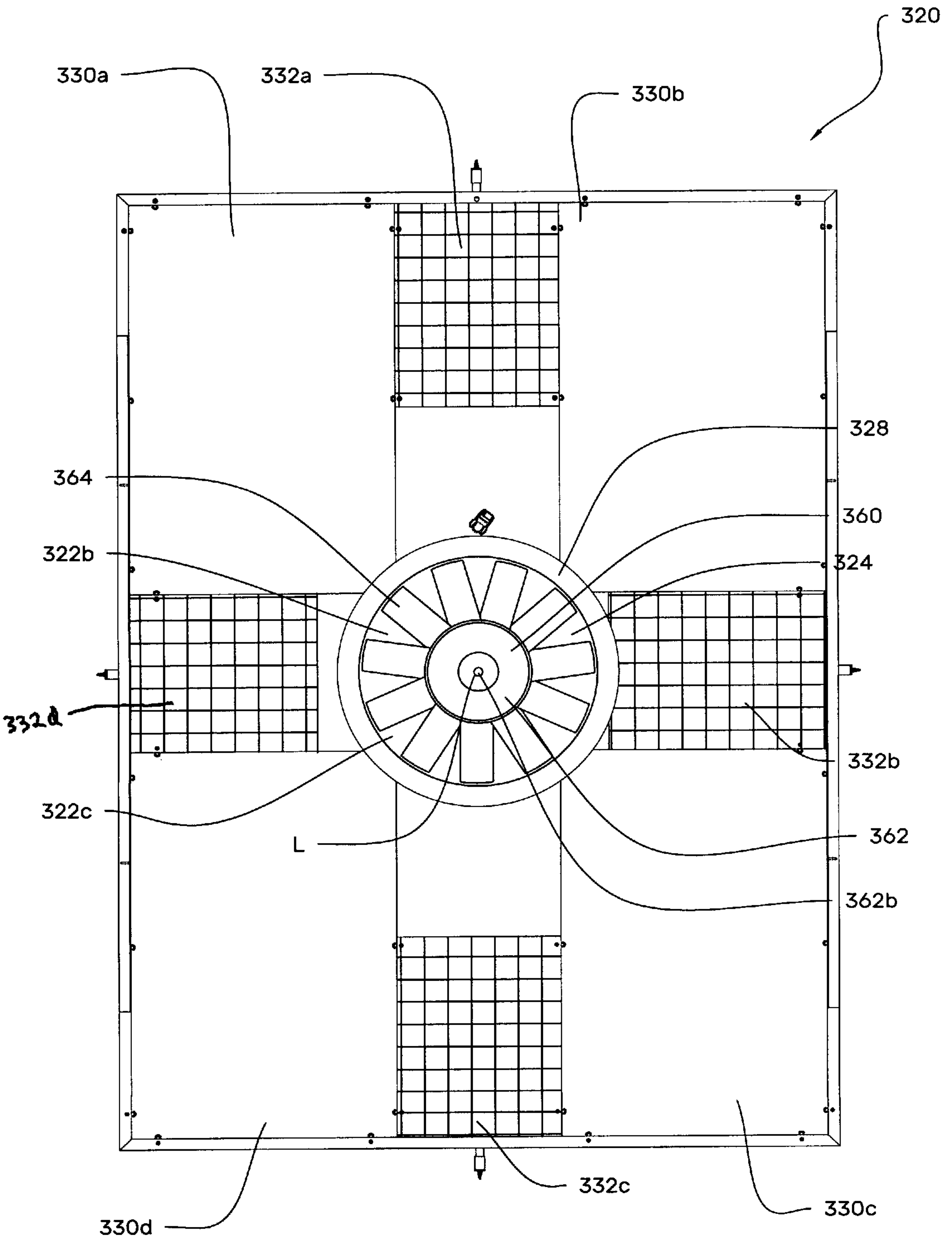
FIG. 10 is another top view of the evaporator shown in FIG. 8, but wherein the top portion of the housing is shown in cutaway, and more specifically the grille at the air intake has been removed, to illustrate the impeller.
Figure 11:
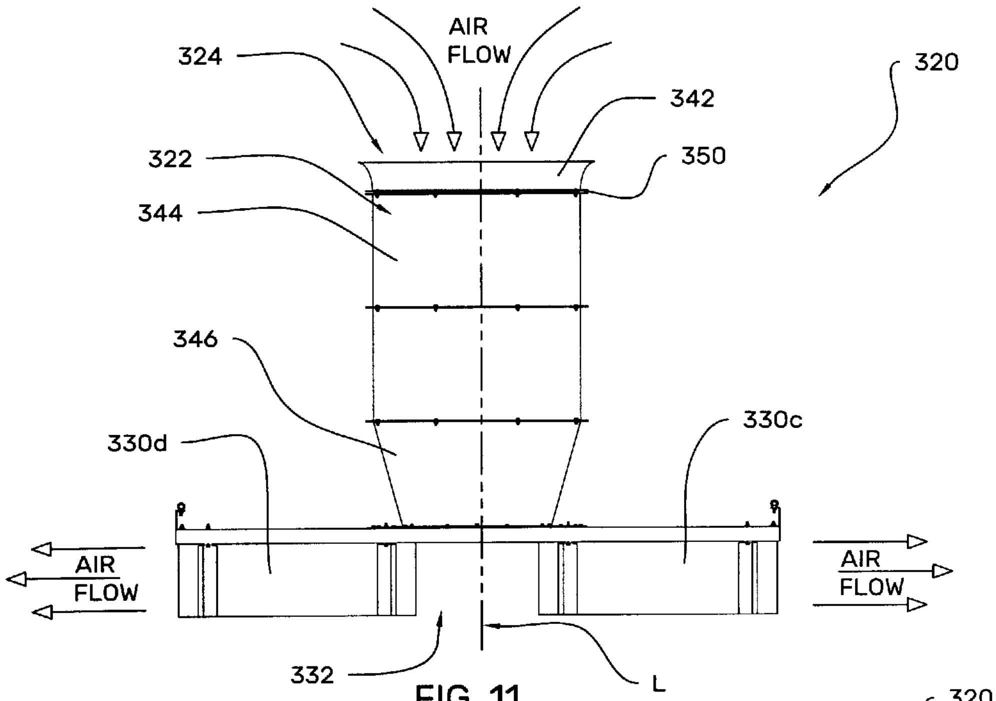
FIG. 11 is a width-wise side view of the evaporator of FIG. 8, viewed from section B-B as shown in FIG. 9.
Figure 12:
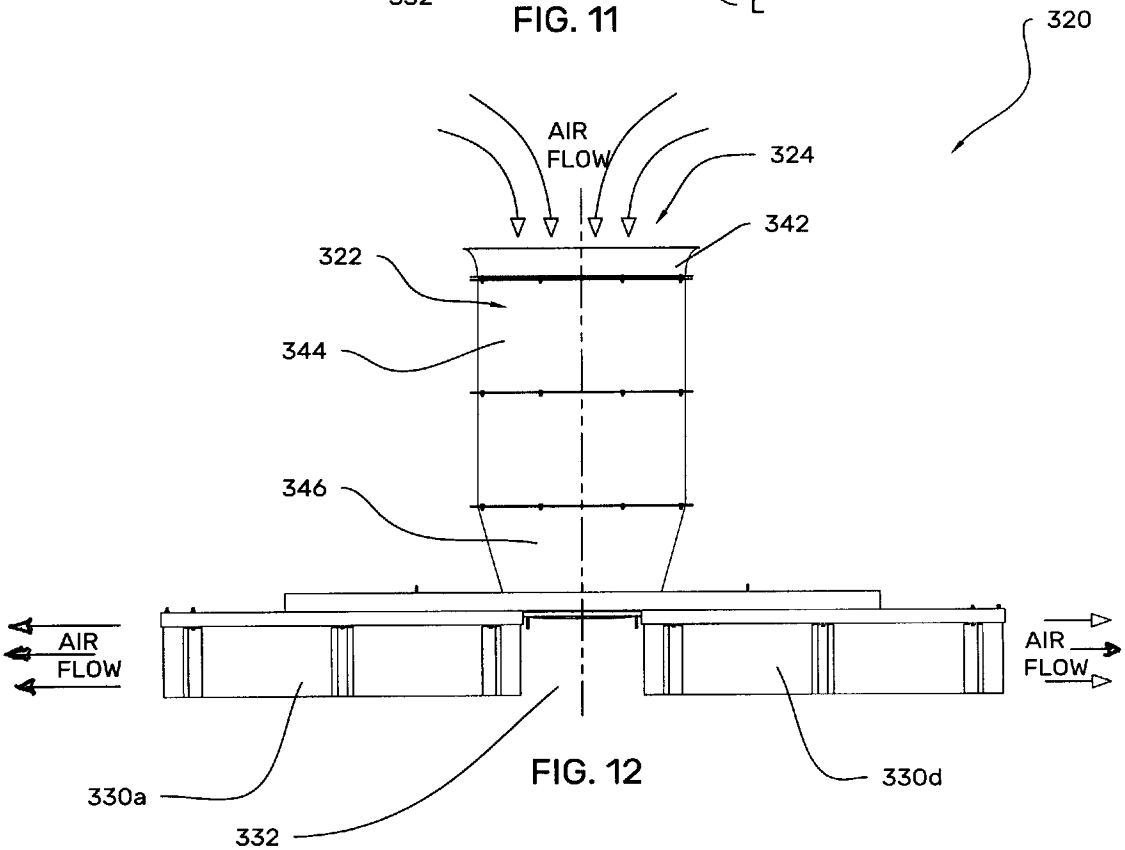
FIG. 12 is a length-wise side view of the evaporator of FIG. 8, viewed from section C-C of FIG. 9.

An evaporator 320 according to another presently-preferred embodiment of this aspect of the invention will now be described. Evaporator 320 is shown in perspective view in FIG. 8. FIG. 9 shows a top or plan view. FIG. 10 shows a top view essentially the same as FIG. 9, but in cutaway in that the housing inlet grille has been removed. FIG. 11 shows a side view from the perspective of arrows B-B in FIG. 9, and FIG. 12 shows a side view from the perspective of arrows C-C in FIG. 9.

Figure 16:
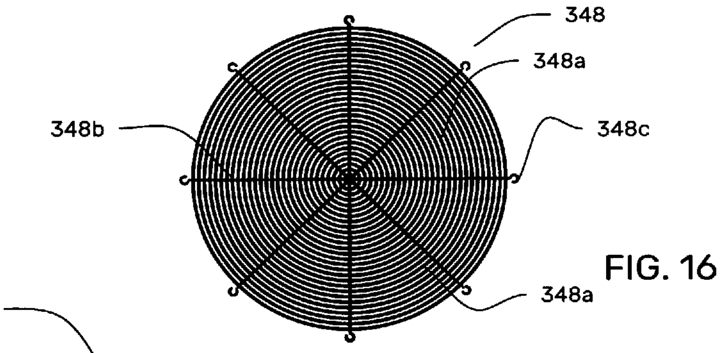
FIG. 16 shows a longitudinal view of the inlet grille for the evaporator of FIG. 8.

Evaporator 320 includes a housing 322 which in this embodiment comprises a fan casing 322*a* fabricated from a suitable corrosion-resistant material having appropriate mechanical strength and rigidity, such as stainless steel. Housing or fan casing 322 includes an inlet bell 342 at its distal end. Downstream from inlet bell 342 is a cylindrical section 344 and downstream of it is an outlet cone assembly 346. A circular air inlet grille 348 is disposed between inlet bell 342 and cylindrical housing section 344. Inlet grille 348 is shown in position on evaporator 320 in FIGS. 8 and 9 and separately in FIG. 16. It includes a plurality of concentric circular grille rods 348*a* spaced apart from one another, and a plurality of radial support rods 348*b*. A ring 348*c* is disposed at the end of each support rod 348*b* to receive a machine screw or other fastener. Preferably but optionally the grille rods 348*a* are spaced about one-half inch apart from one another.

Figure 17:
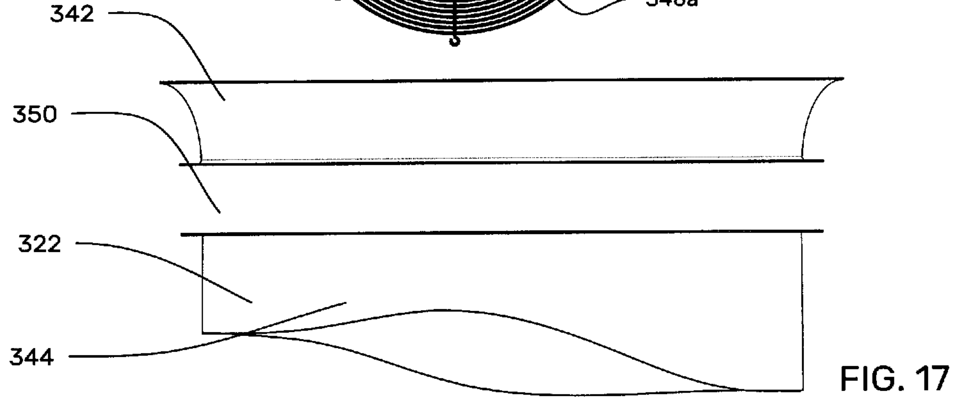
FIG. 17 is a side view of the inlet bell, cylindrical housing section and air gap for evaporators of the type shown in FIG. 8.
Figure 18:
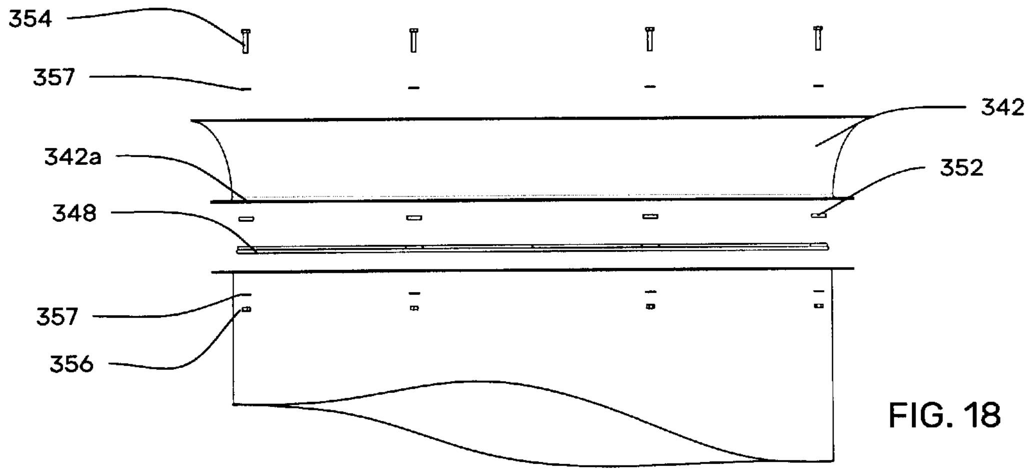
FIG. 18 is a side exploded view of the inlet bell, inlet grille, cylindrical housing section and air gap for the evaporator of FIG. 8.
Figure 19:
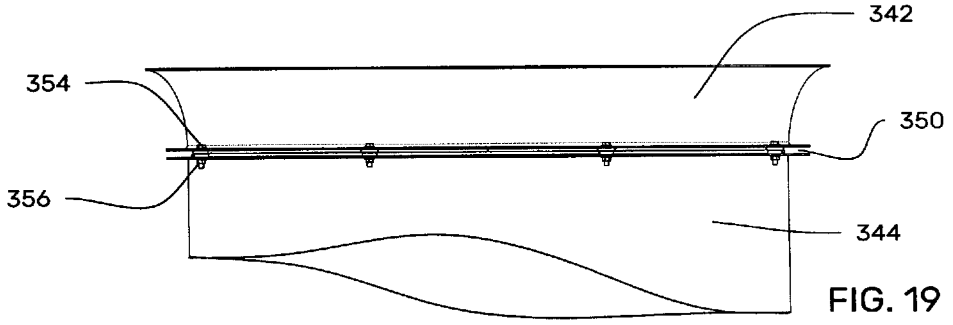
FIG. 19 is a side view of the assembled inlet bell, inlet grille, cylindrical housing section and air gap for the evaporator of FIG. 8.

According to another aspect of the invention, a gap is provided in the distal end of the housing downstream of the inlet bell or other corresponding air inlet and spaced from the upstream edge of the housing flow channel that allows the entry of air through the gap and into the housing flow channel. In presently-preferred evaporator embodiments, and with reference to the illustrative housing section in FIG. 17, a gap 350 is provided between the downstream edge of air inlet bell 342 and the upstream edge of cylindrical section 344 of housing 322. Gap 350 optionally but preferably extends all of the way or substantially all of the way around the perimeter of the housing 322, preferably orthogonally to longitudinal axis L. In terms of its function, although not wishing to be limited to any particular theory of operation, the inventors believe that as air flows into the inlet bell and into the cylindrical section of the housing, in the absence of the air gap, edge effects and other flow interruptions cause the air being inducted into the housing flow channel to experience boundary layer separation and turbulent eddy flow that reduce the flow rate down the flow channel. By introducing an air gap proximate to the upstream end of the housing air flow channel, low pressure zones that can give rise to these effects are mitigated by the flow of air into these low-pressure zones through the air gap.

As implemented in evaporator 320, a gap 350 is provided by sandwiching grille 348 between inlet bell 342 and cylindrical housing section 344. More specifically, a flange 342*a* is disposed at the downstream edge of inlet bell 342, and a corresponding flange 344*a* is disposed at the upstream edge of cylindrical housing section 344. Mating holes are provided in each of these flanges corresponding to rings 348*c* in grille 348. Spacers 352, preferably comprising an elastomeric or polymeric material, are provided at the loops and holes immediately above and immediately below grille 348. Machine bolts 354 and matching nuts 356 used to position and fix or immobilize inlet bell 342, grille 348 and housing section 344, and spacers 352 space these components to create and maintain air gap 350.

Evaporator 320 also comprises a support 330 that includes rectangular box-like float structures or floats 336*a-d*, respectively, fixedly positioned to one another to form a substantially-rectangular floating surface.

Figure 13:
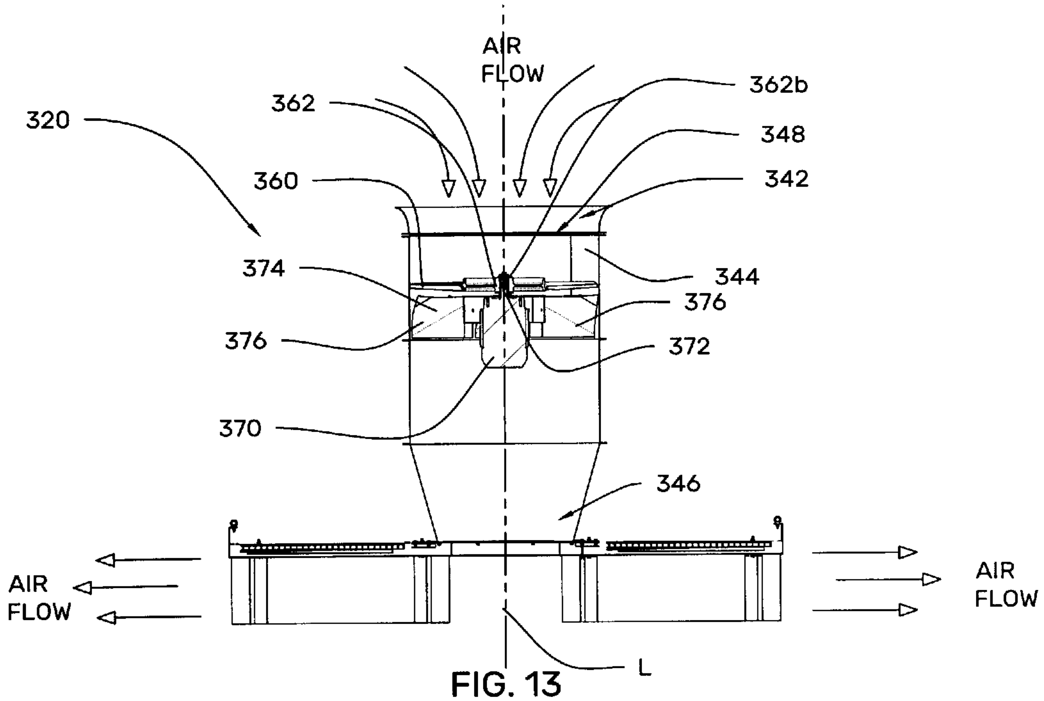
FIG. 13 is a width-wise side cutaway view of evaporator of FIG. 8 similar to FIG. 11, viewed from cutaway section E-E of FIG. 9.
Figure 14:
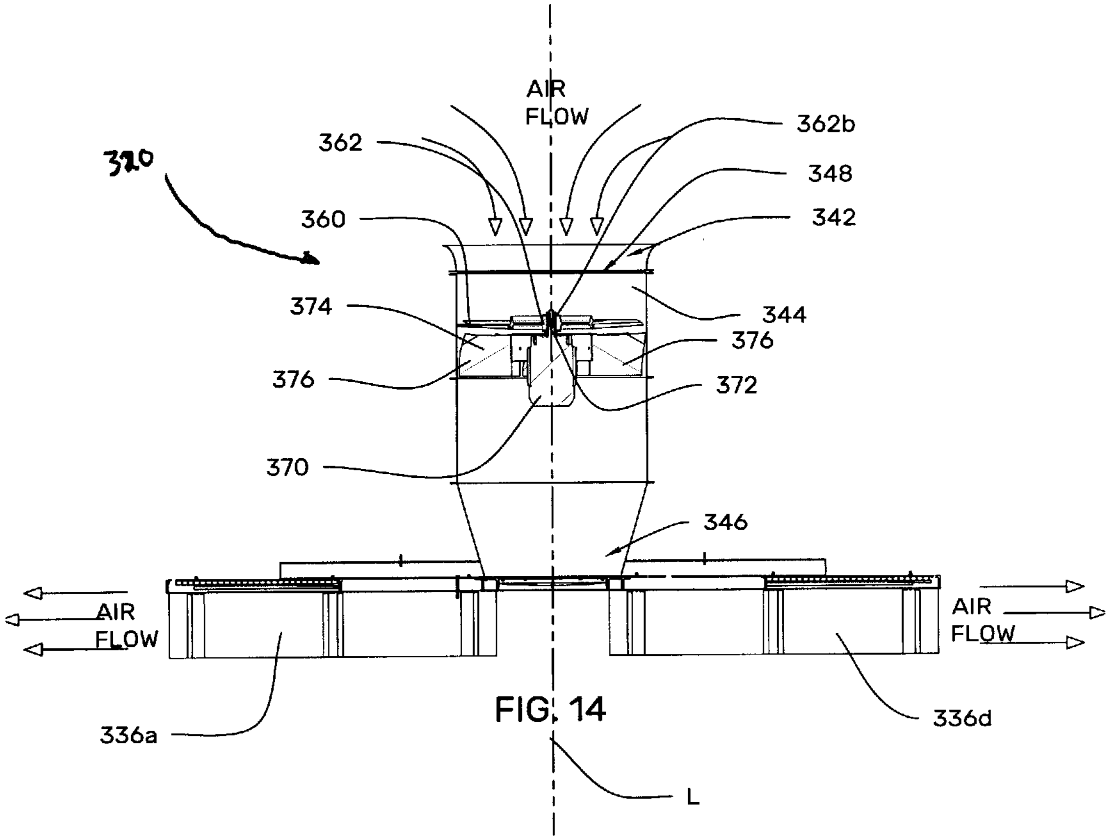
FIG. 14 is a length-wise side cutaway view of evaporator of FIG. 6 as shown in FIG. 10, viewed from cutaway section F-F of FIG. 9.

Internal components of the housing flow channel 324 and float assembly flow channels 332 can be seen in FIGS. 13 and 14. FIG. 13 shows a side cutaway view of evaporator 320 from the perspective of arrows D-D in FIG. 9, and FIG. 14 shows a side cutaway view from the perspective of arrows E-E in FIG. 9. A bottom view of the evaporator is provided in FIG. 15.

The interior volume 322*b* of fan casing 322*a*, which in this embodiment is formed by the opposite side of the fan casing material, comprises a housing air flow channel 324 through which air flows downwardly from distal end 328 to proximal end 326 of housing 320. The interior surface 322*c* of fan casing 322*a* has a substantially smooth surface that is largely free of obstructions to air flow.

This is not, however, necessarily limiting. Housing 322 may, for example, comprise fan casing 322*a* but with a separate interior annular wall or conduit conformally disposed against the interior 322*b*, wherein the inside wall or surface of the interior annular wall or conduit forms or comprises the wall of housing flow channel 324. Similarly, the separate interior wall may be spaced from the interior wall 322*c* to provide an annular space. The annular space could be occupied by a vacuum or by air or comprise an air gap, or could be partially or fully filled, for example, with an insulating material, a heat jacket, and so on.

An impeller 360 is positioned centrally within fan casing 322*a* and housing flow channel 324 with respect to longitudinal axis L. Impeller 360 comprises a hub 362 and a plurality of blades 364 emanating from hub 362. A hub axle aperture 362*b* is disposed at the center of hub 362 at longitudinal axis L.

A motor 370 is disposed immediately below and downstream of impeller 360. Motor 370 is positioned so that its shaft 372 lies along longitudinal axis L and extends into hub axle aperture 366 so that motor 370 when actuated drives impeller 360. The motor in the various preferred embodiments disclosed herein preferably is an AC induction motor, but can also be any motor that produces the desired torque and rotational speed or RPM for operation. Examples would include hydraulic motors, pneumatic motors, direct current motors, and various other motive units that can turn the impeller at the desired RPM. In these illustrative embodiments, the motor preferably but optionally has a power rating of three to fifty horsepower, depending on the specific application, the conditions under which it is expected to perform, and so on. An illustrative but in many applications a presently-preferred example involves the use of a five horsepower AC induction motor for the motor, including for motor 370. Although it depends on the specific evaporator, impeller and other factors, this size of motor can provide ample torque and speed for impeller 350, but this relatively low motor size and its correspondingly relatively low power and energy demands enables it to be used in many applications where the available power, voltage, etc. are limited. Impeller 350 and motor 360 are held in fixed position within housing 322 by an impeller support structure 374. A plurality of guide vanes 376 are disposed immediately downstream of the blades of impeller 360 to straighten the downstream air flow stream.

In the presently-preferred embodiments described herein above, the housing flow channel comprises a single channel symmetrically disposed about the longitudinal axis L of the evaporator housing. This is not, however, necessarily limiting. The housing flow channel instead, for example, may comprise a plurality of subchannels disposed longitudinally disposed within housing 320.

Figure 15:
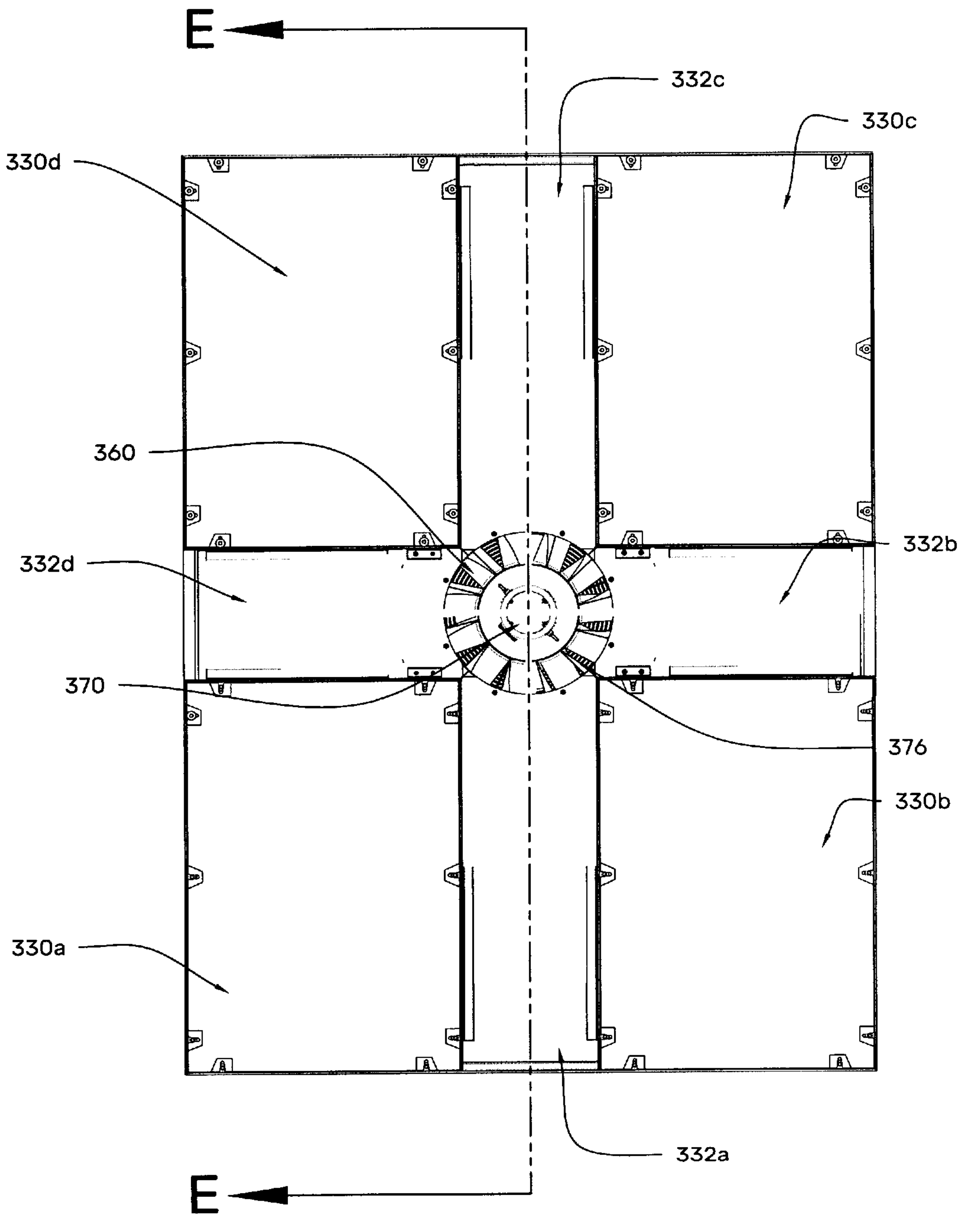
FIG. 15 is a bottom view of the evaporator of FIG. 8.

As shown, for example, in FIGS. 9 and 15, float assembly 330 comprises four substantially identical floats 330*a-d* fixedly positioned with respect to one another so that they form a larger rectangular base or foundation with central spaces between them to form substantially perpendicular lengthwise and width-wise float assembly air flow channels ("float channels") 332*a-d*. The size of the channels ideally is relatively large to permit free and unobstructed flow of the air through them and out their distal or exit ends. This is not, however, necessarily limiting. One may instead, for example, use two elongated floats, in effect integrating floats 330*a* and *d* into a single float and integrating floats 330*b* and *c* into a single float, to form a single float assembly air flow channel. As another example, and with reference to FIGS. 6 and 7, one may add additional float assembly air flow channels such as those shown as 232-*wd* and 232-*we*.

As a practical matter, given the typical design objective that the floats be of sufficient size and buoyancy to provide a stable above-water surface platform for the evaporator or evaporators, one often must make a practical tradeoff between these two considerations to provide a suitable base while providing the largest reasonable float assembly air flow channel cross sectional flow area that can be supported.

A power supply to supply motor 370 also is provided. An example of a suitable power supply would be a standard shore-based electrical power supply provided to motor 370 via a water use-qualified transmission cable. A power switch to turn the power on and off may be positioned at evaporator 320 or at the shore power source or both. Preferably, for ease of access and use, the power switch in this embodiment is located at the shore-based power source.

The operation of evaporator 320 under normal operating conditions will now be described. The system is first powered up by turning the power switch to the on state, whereupon motor 370 powers up and spins up impeller 360. The impeller, which in this embodiment rotates in a counterclockwise direction, builds up its rotational speed until it reaches its rated or design speed. In this presently-preferred embodiment, the preferred rotational speed for normal operations of impeller 360 is between about 500 and 3,600 rounds or revolutions per minute ("RPM"), and more preferably about 1,200 RPM.

Figure 20:
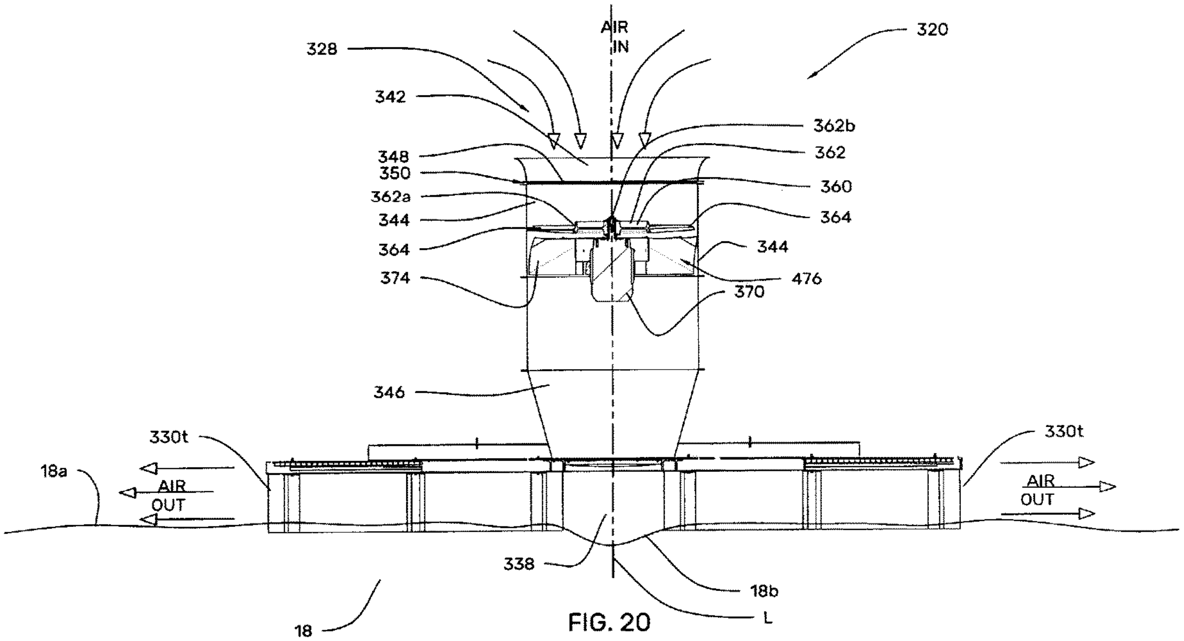
FIG. 20 is a side cutaway view of the evaporator of FIG. 8, and illustrates its operation.

As the impeller rotates, it draws relatively dry ambient air from distal end 328 of housing 322 into and downwardly through housing flow channel 324, into and through the float assembly flow channels 332*a-d*, and out the float channel exits 332*t*, for example, as illustrated in FIG. 20.

As the relatively dry ambient air reaches the intersection or joinder 338 of housing flow channel 324 and the float assembly flow channels 332*a-d*, the impact momentum of the air at the impact zone 18*b* causes a depression in water surface 18*a*. The water at and around the impact zone is mixed with the air sufficiently and with sufficient force that it causes the water to form droplets in the air, it causes the humidity of the air to increase, and preferably and typically both. This process continues as this now-wetted air is forced down the float assembly air flow channels 332 and out of the channels along the surface of the water 18*a*. In addition, the flow of the wetted air typically has the effect of removing the water vapor that under normal conditions (absent the air flow) resides at the water-air interface at water surface 18*a*. Although not wishing to be bound by or to any particular theory of operation, under typical ambient conditions, the air contacting and immediately adjacent to a quiescent water surface will contain a certain concentration of water vapor. At equilibrium and under constant temperature and pressure, that concentration will be fixed and there will be no net diffusion of water vapor between the bulk water phase and the bulk air phase. As air is moved over the water-air interface, part or all of the water vapor at this interface and in the bulk air phase is removed, thus lowering the concentration of water vapor at the interface. The resulting difference in water vapor concentration between the bulk water and bulk air at the interface provides a driving force to cause molecular diffusion of water vapor into the air phase, thereby facilitating further evaporation of the bulk water phase.

In addition, the air flow regime for evaporators such as evaporator 320 will facilitate evaporation of the wet air phase or water droplet-containing air phase. The center of the plume of wetted air emerging from the float channels ideally will comprise saturated air (air containing the maximum amount of water vapor for the given temperature of the air) or supersaturated air. It typically will be surrounded by relatively dryer and typically slightly relatively warmer air. The air flow movement across the surface of the water or otherwise through the air around the float assembly flow channel exits and around the ensuing output air plume will draw in the relatively-dryer and typically relatively-warmer ambient air surrounding the air flow or plume, for example, as illustrated by FIGS. 4 and 5. This infusion of dryer air mixes with the wetted air phase, warms it, and is believed to facilitate evaporation of the wetted air phase.

Ideally the composition of the wetted air phase and it's flow out of the float assembly flow channels is such that the conditions for evaporation of the wet air phase are maximized. In practice, this ideal becomes a goal. One approach to increasing the evaporation rate of the wetted air phase is to make the water droplets as small as possible, or as small as is reasonably achievable under the circumstances. This decreased droplet size significantly increases effective surface area from which evaporation can take place. The evaporator may affect this droplet size by increasing the air flow rate. Again, not wishing to be bound by any particular theory of operation, the momentum and air flow effects at relatively higher air flow velocities are more effective at physically separating the water into bulk parcels, and at overcoming the surface tension effects of the water so that smaller droplets can be formed.

These wet air conditions and corresponding flow conditions typically can be controlled in evaporator systems such as evaporator 320 by controlling such variables or design features as the air flow rate, the air flow regime, the air flow velocity, the temperature of the air, the pressure of the air, and others.

An evaporator 420 according to another presently-preferred embodiment of this aspect of the invention will now be described. Evaporator 420 is identical in all respects previously described with respect to evaporator 320. In this embodiment, however, evaporator 420 comprises a water distribution system that distributes water within the support flow channels, at the ends or exits of the support flow channels, or both, preferably by injecting water into the air flow stream. The injection process may involve spraying the water so that it forms water droplets in the air flow stream, and more preferably so that the water is atomized.

Figure 21:
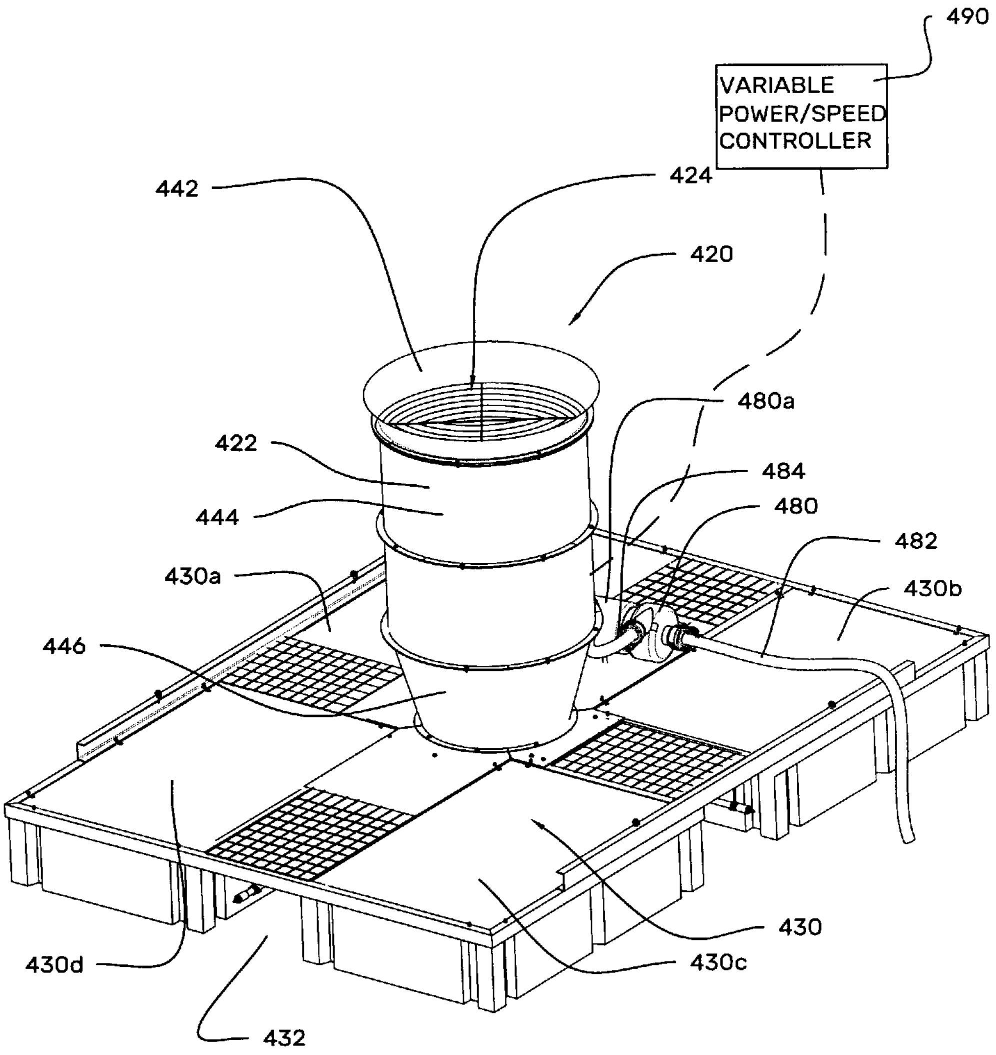
FIG. 21 is a perspective view of an evaporator according to another presently-preferred embodiment of an aspect of the invention.
Figure 23:
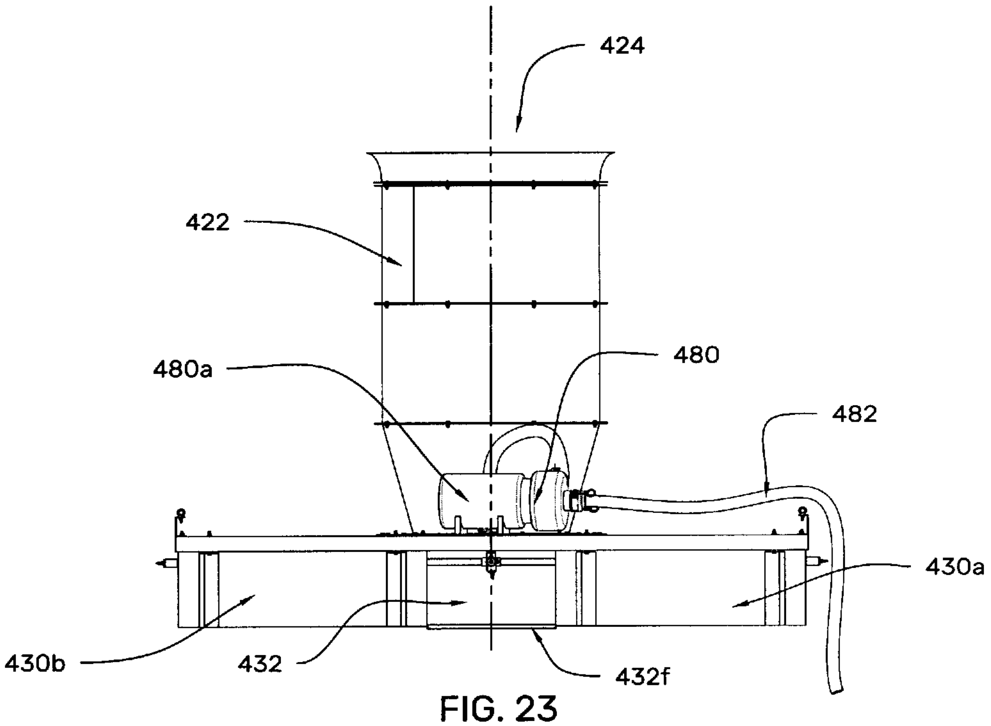
FIG. 23 is a width-wise side view of the evaporator of FIG. 21, viewed from section G-G as shown in FIG. 22.
Figure 24:
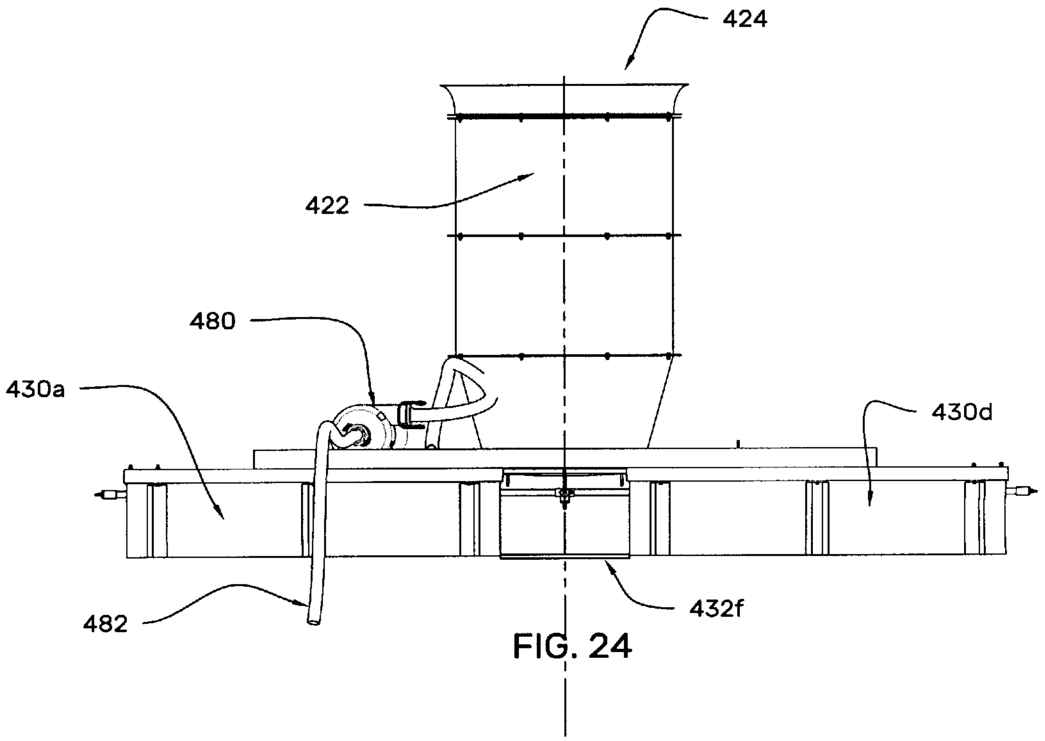
FIG. 24 is a length-wise side view of the evaporator of FIG. 21, viewed from section H-H of FIG. 22.
Figure 25:
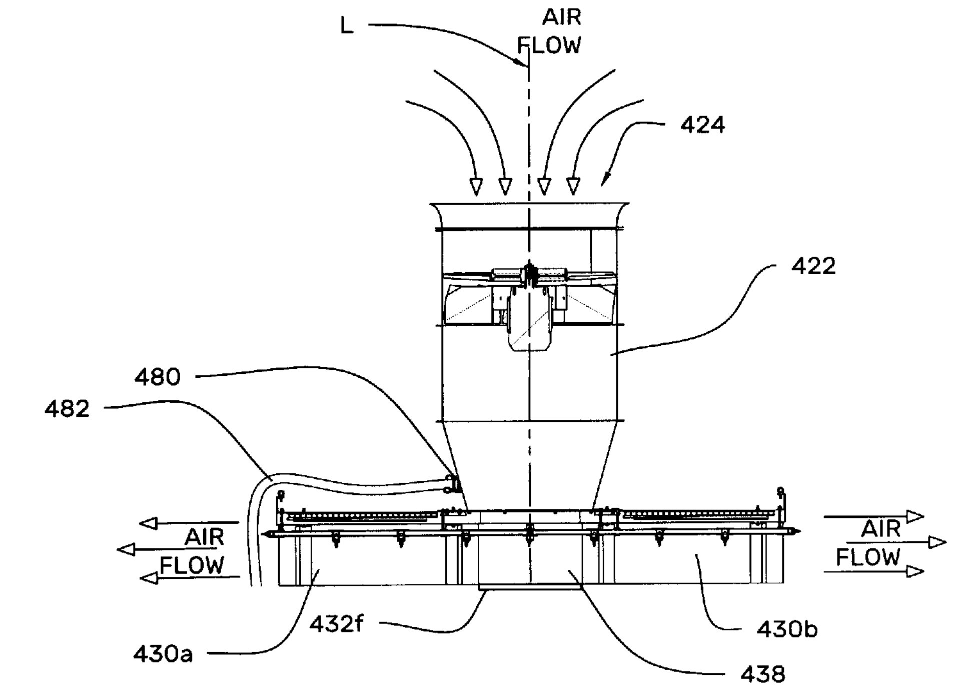
FIG. 25 is a width-wise side cutaway view of evaporator of FIG. 21 similar to FIG. 23, viewed from cutaway section I-I of FIG. 22.

Evaporator 420 is shown in perspective view in FIG. 21. A top view is provided in FIG. 22, and short and long side views are provided in FIGS. 23 and 24, respectively.

This embodiment comprises a housing 422 and float assembly 430 as described herein above with respect to evaporator 320. Evaporator 420 differs from evaporator 320, other than the addition of the water distribution system, only in that the bottom portion of float assembly 430, and particularly the area under the float assembly flow channels, comprises a solid or water-impermeable surface **432*f*, e.g., such as a relatively thin but mechanically- and structurally-sound sheet of material, a tarp or the like that prevents the air flow from impeller 460 from directly impacting the surface of the water 18*a* or prevents the water at the water surface 18*a* from being forced into the air flow stream in the float channels 432 or both, and therefore does not employ the same impact zone-related wetted air formation process as described herein above with respect to evaporator 320**.

As noted, the water distribution system injects water into the air flow stream. In evaporator 430 this comprises spraying water into the air flow stream within the support flow channels, at the end of the support flow channels, or both. The water is drawn or sourced from the water body, and sprayed in droplet or atomized form, or so as to create droplets or atomization.

Figure 22:
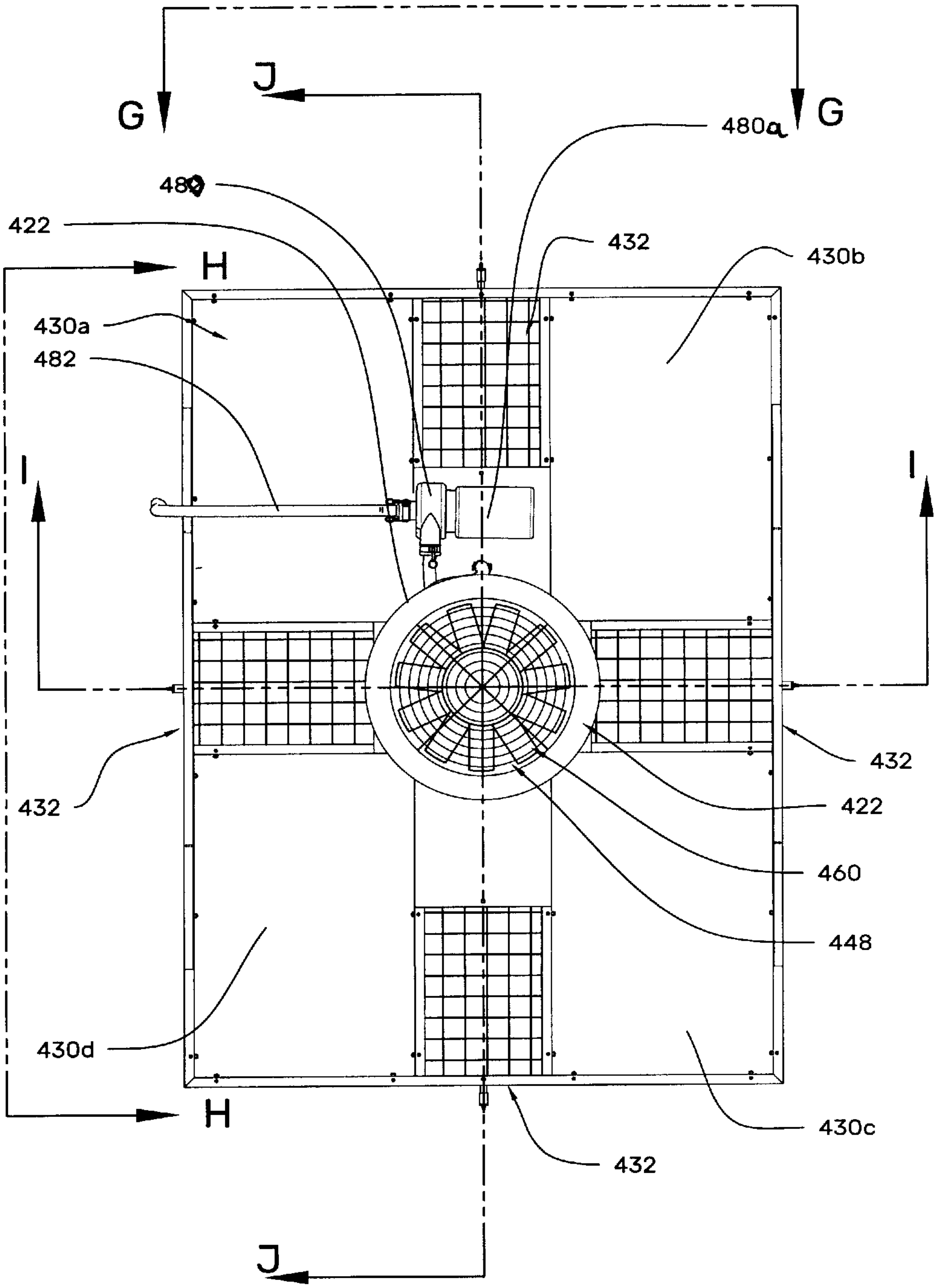
FIG. 22 is a top view of the evaporator shown in FIG. 21.
Figure 26:
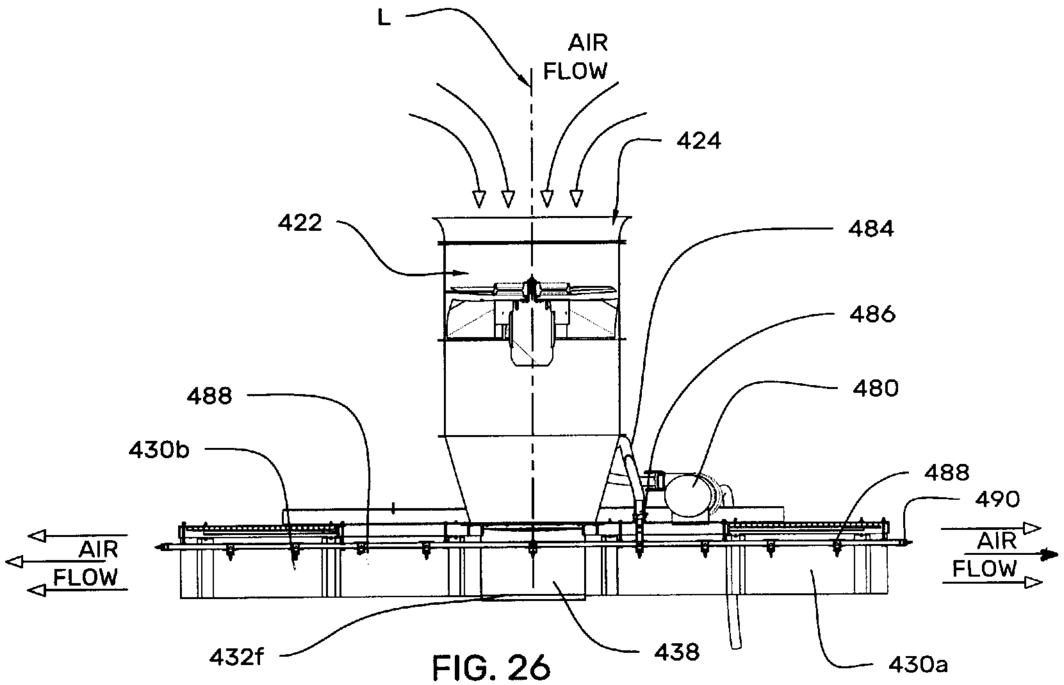
FIG. 26 is a length-wise side cutaway view of evaporator of FIG. 21 as shown in FIG. 24, viewed from cutaway section J-J of FIG. 22.

As shown, for example, in FIG. 22, the water distribution system comprises a pump 480 driven by a drive energy source such as motor **480*a*. Pump 480 is coupled at its inlet side to a water source pipe or hose 482 disposed on the upper surface of float assembly 430 that supplies water 18 from water body 10. The pump may be selected from the typically-used fluid pumps that are commercially available. Drive energy source may be an AC or DC electric motor, a hydraulic or pneumatic motor or drive, or other motive force designed to turn the pump in a fashion to produce work in moving the fluid at various volumes and pressures. In some cases it may even be a shaft, belt or other cooperative coupling operatively coupled to the impeller drive motor (i.e., such as motor 370 in evaporator 320). In this embodiment, water source pipe or hose 482 comprises a flexible suction hose 482 having one end coupled to the input side of pump 480 and the other end extended over the edge of float assembly 430 and into the water 18. The outlet side of pump 480 is coupled to a spray distribution conduit network 484. Conduit network 484 includes a pressure hose or pipe 484*a* that passes through an aperture 486 in the surface of float assembly 430, as shown in FIGS. 26 and 27**.

Figure 27:
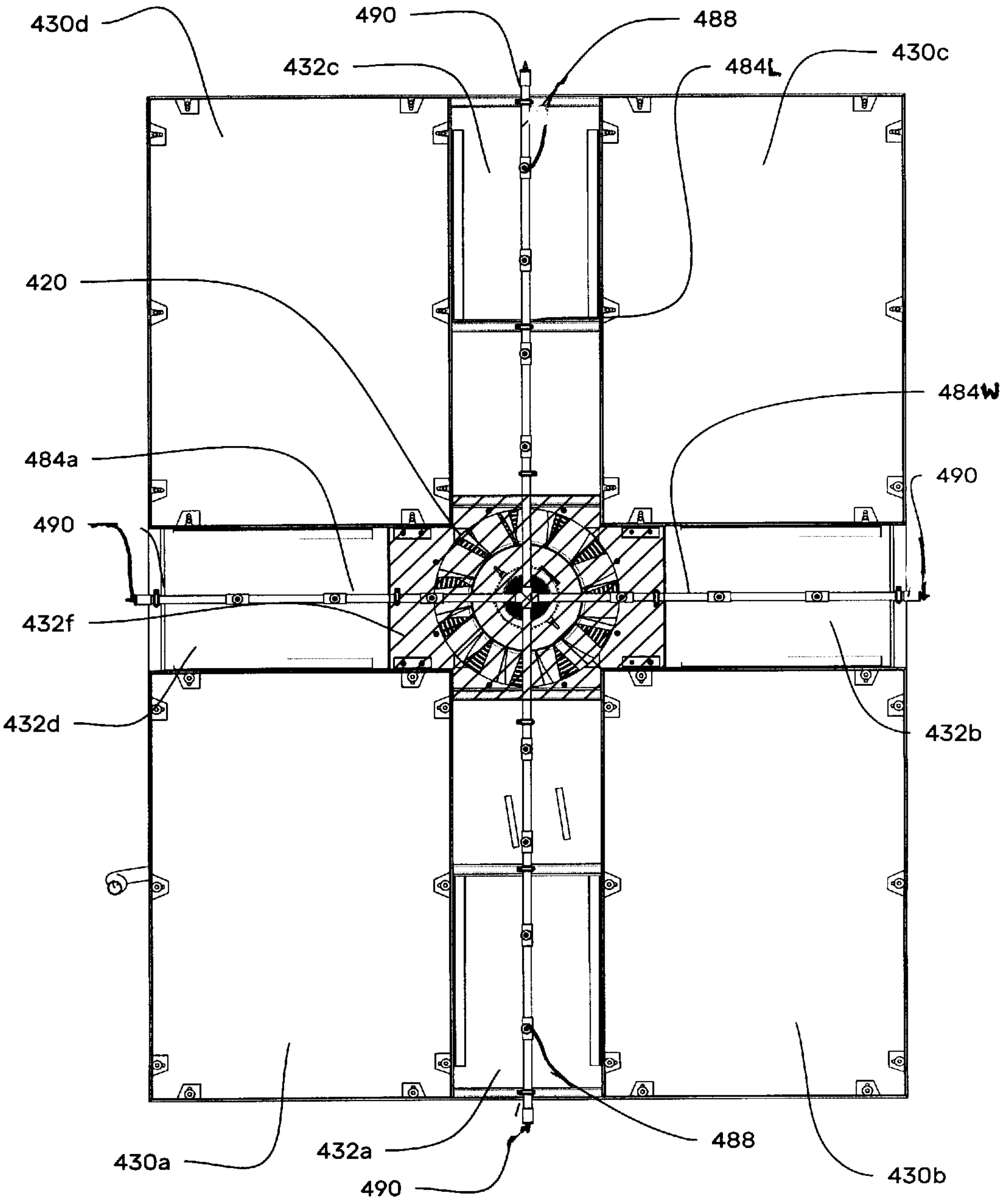
FIG. 27 is a bottom view of the evaporator of FIG. 21.

With reference to FIG. 27, which shows a cutaway view of the bottom of evaporator 420 with solid surface **432*f* shaded as if omitted, pressure conduit 484*a* of conduit network 484 passes through float assembly 484 and couples to a lengthwise conduit 484L that extends down the length of float assembly 430 on its underside and forms a part of conduit 484. Conduit 484L, which may comprise, for example, a polyvinyl chloride (PVC) or more preferably a stainless steel, aluminum or other suitable corrosion-resistant metal pipe, is fluidically coupled to a width-wise conduit 484W, optionally but preferably comprising the same material and construction, that extends across the width of float assembly 430, also on its underside and also forming a part of conduit 484**.

A plurality of nozzles 488 is disposed down the length of conduit 484L and down the length of conduit 484W. In addition, a nozzle 490 is disposed at each end of conduit 484L and of conduit 484W. Nozzles 488 optionally but preferably are directed downwardly toward the water surface **18*a*. Alternatively, some or all of them may be pointed in directions that are angled with respect to one another, e.g., so that the combined spray patters of the nozzles collectively cover the entire space of the float assembly flow channel in which they are disposed. The spray pattern of the individual nozzles may vary, but preferably are substantially uniform, having a spray angle of between about 45 and 180 degrees. The end nozzles 490** also may have a variety of angles for their spray pattern or patterns, but preferably they all have substantially the same spray patter with a spray angle of about 45 to 180 degrees. The spray patterns from adjacent nozzles may undershoot one another, they may overshoot or overlap one another, or they may be neither undershooting nor overshooting and thus be conformal.

Figure 28:
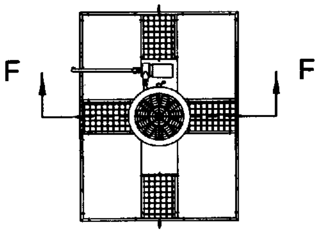
FIG. 28 is a side cutaway view of the evaporator of FIG. 21, and illustrates its operation.
Figure 28:
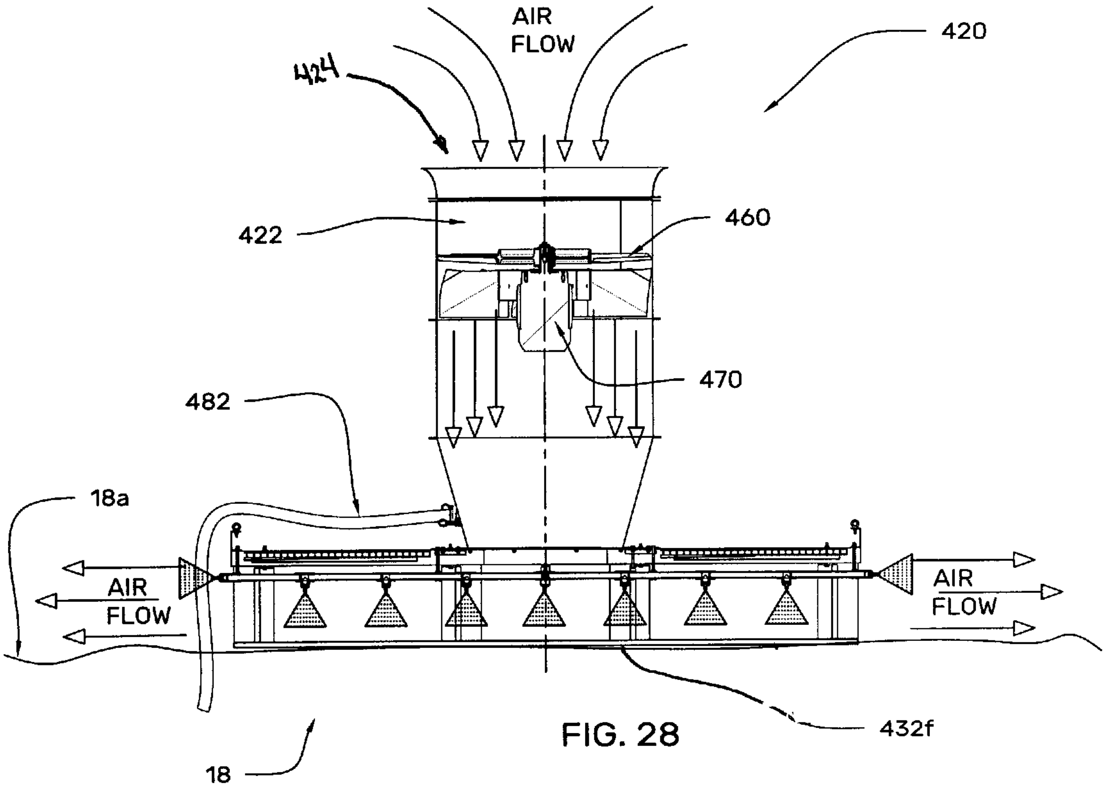

In operation, and with reference, for example, to FIG. 28, evaporator 420 is powered up by turning the power switch to the "on" state, whereupon motor 470 powers up and spins up impeller 460. The impeller draws ambient air from distal end 428 of housing 422 into housing flow channel 424, downwardly through flow channel 424 where it impacts surface 432*f* but does not directly impact the water surface 18*a*, into and through the float assembly flow channels 432*a-d*, and out the exits of the float assembly float channels 432*t*.

As the power-up occurs, power also is applied to pump motor 480*a*. As pump 480 operates, it pulls water 18 from water body 10 into the pump inlet via suction hose 482. The water received at pump 480 is then outputted into conduit network 484 and specifically into conduits 484L and 484W. Under the pressure of pump 480, the water is forced through interior nozzles 488 and end nozzles 490, which injects a water spray, preferably comprising atomized water droplets, throughout the float assembly flow channels 432.

As the ambient air passes through the float assembly air flow channels 432L and 432W, the water spray or atomization within those flow channels contacts the air flow stream. The moving air entrains the droplets. In some instances the momentum of the air flow breaks the droplets into smaller droplets. As the droplets interact with the moving air in the float assembly flow channels, some of them enter the gas phase. These various events serve to convert the relatively-dry ambient air from housing 422 into a wetted air phase. That wetted air phase is outputted from exit terminals 432*t* of the float assembly flow channels. Exit spray nozzles 490 further spray water into the wetted air phase as it exits the float assembly flow channels. The momentum of the wetted air phase imparted by impeller 460 carries it over the surface of the water 18*a* as described, whereupon the effects described herein above, for example, in connection with the illustrations of FIGS. 4 and 5, may occur.

An evaporator 520 according to yet another presently-preferred embodiment of this aspect of the invention will now be described. Evaporator 520 is identical in all respects to previously-described evaporator 320 and in addition comprises the water distribution system as described herein above for evaporator 420. Thus, it combines the impact zone-related features of evaporator 320 and the water injection features of evaporator 420 as described herein above.

Figure 29:
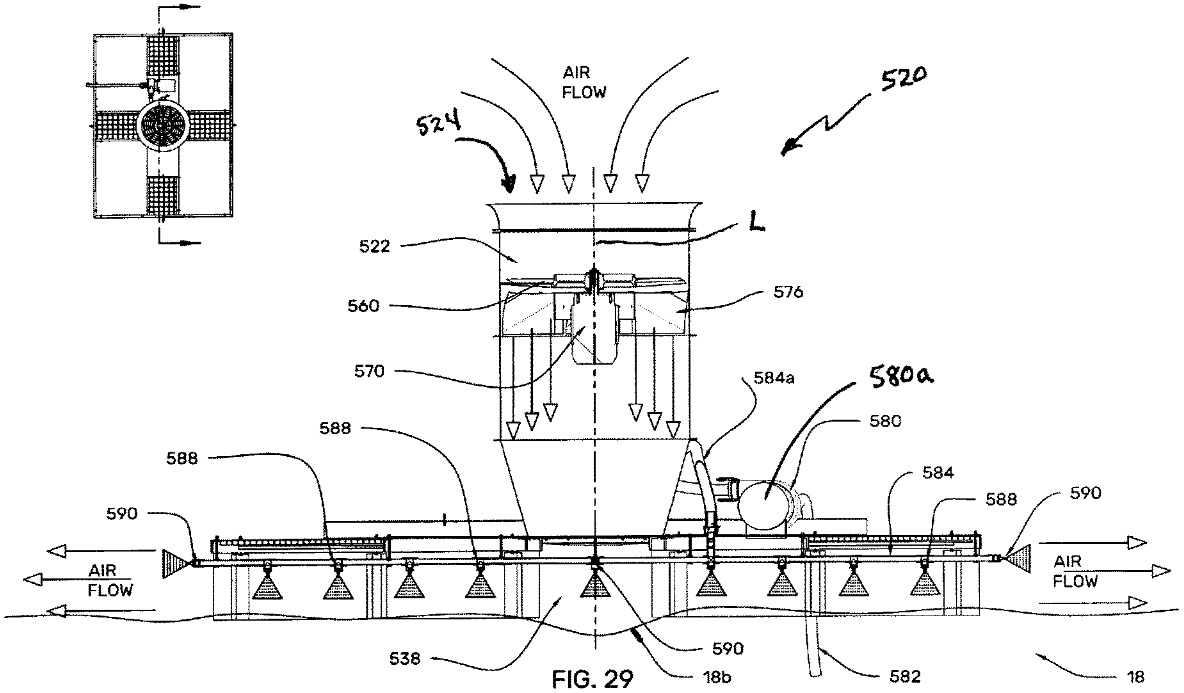
FIG. 29 is a side cutaway view of an evaporator according to another presently-preferred embodiment of an aspect of the invention.
Figure 30:
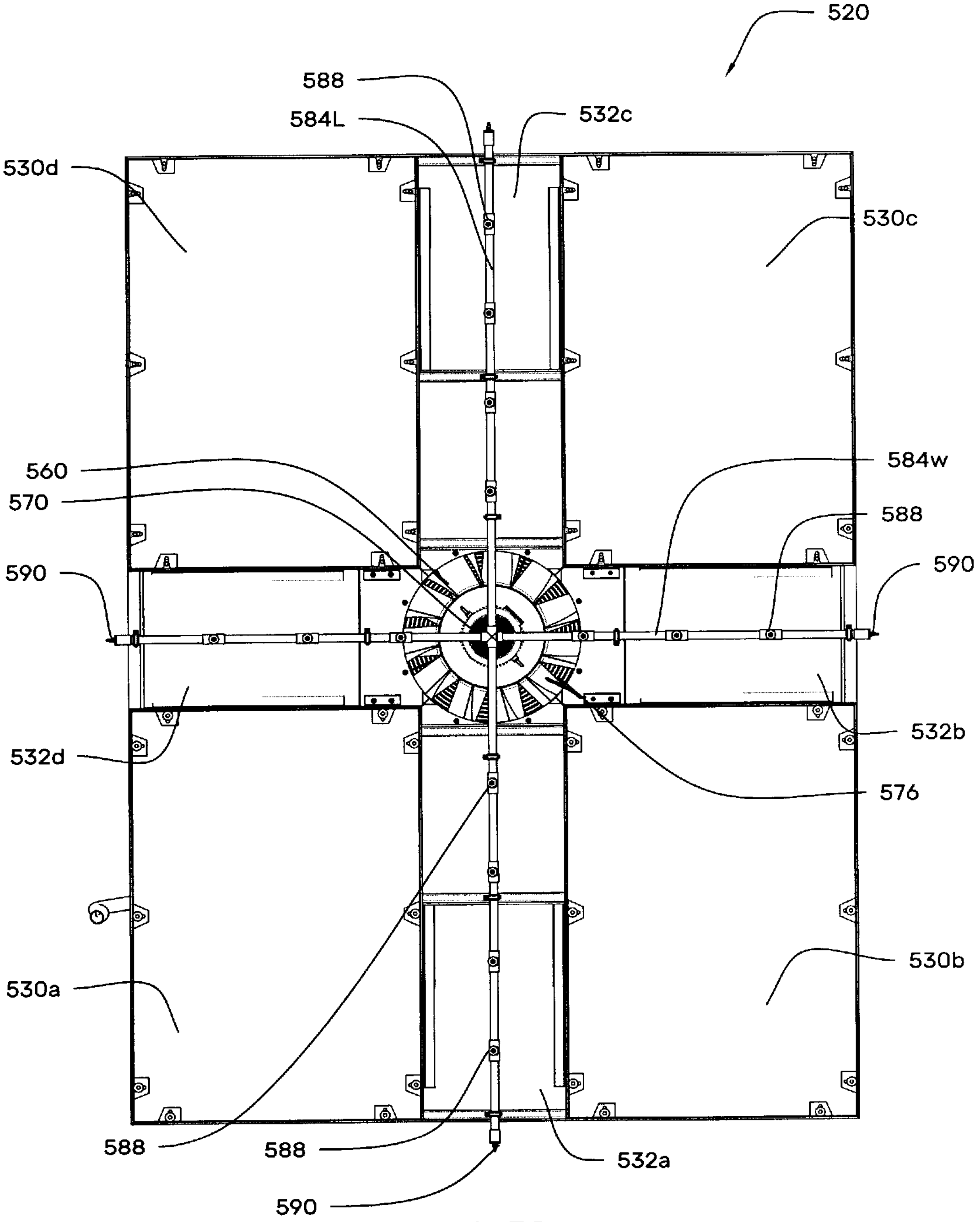
FIG. 30 is a bottom view of the evaporator of FIG. 29.

A side cutaway view of evaporator 520 is shown in FIG. 29. As noted, evaporator 520 comprises the various components, structure and features of evaporators 320 and 420, which are shown in the aforementioned drawing figures and described herein above. Given this commonality, that description will not be repeated here. Reference is made to those descriptions and drawing figures.

It should be noted that in evaporator 520, the bottom of float assembly flow channels 532 is open to the water, e.g., as shown in FIG. 20 (evaporator 320), including in the impact zone 18*b*, and it is not enclosed with a surface, e.g., surface 432*f* as shown in FIGS. 22-26 for evaporator 420.

With reference to FIG. 29, evaporator 520 operates in the following manner. As evaporator 520 is powered up, impeller 560, pump motor 580*a* and pump 580 are actuated. Impeller 560 initiates and maintains the flow of ambient air through housing flow channel 522 and the associated float assembly flow channels and out the float assembly flow channel exits 532*t*. As this occurs, pump 580 pumps water 18 drawn from water body 10 through water distribution conduit network 584.

As the ambient air passes through intersecting volume 538, it contacts the water below housing flow channel 524 at impact zone 18*b*. The air flow stream impacts and interacts with the water surface at that location to create a depression in the water, and to create water droplets and water vapor, as described herein above.

As this occurs, and as the now-wetted air phase traverses through the float assembly air flow channels 532, additional water is sprayed and atomized into the float assembly flow channels by nozzles 588 and end or exit nozzles 590 of the water distribution system to inject water droplets and water vapor into the air stream. This newly-added water interacts with the already wet air stream to create an enhanced wetted air phase. This new addition of water droplets and vapor continues to occur as the enhanced wetted air phase flows out the exits of the float channels 532*t*, onto the water surface 18*a* and into the surrounding air.

In each of the embodiments described herein for which an impeller is used, including impeller 360 and impeller 460, and related embodiments, systems and methods, presently-preferred impeller and impeller system embodiments useful for incorporation or use in evaporators, systems and methods according to the invention here are disclosed in commonly-owned and assigned U.S. Provisional Patent Application No. 62/656,856, entitled "Impeller and Related System and Method," incorporated herein by reference above.

Each of the evaporators described herein above have a housing that is disposed orthogonally with respect to the surface of the water 18*a*. In other words, each housing and housing flow channel have been described as being disposed about a longitudinal axis L and disposed such that the longitudinal axis L is orthogonal with respect to the plane of the surface of the water. This configuration, however, is not necessarily limiting, and other angular configurations may be used.

Figure 31:
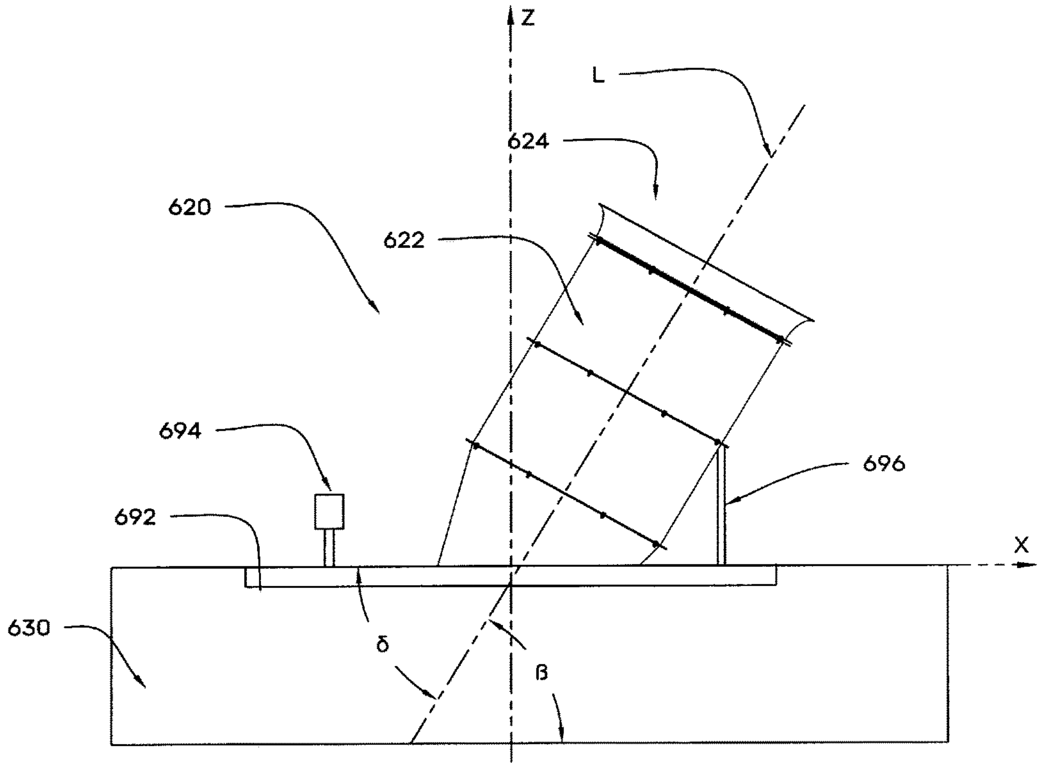
FIG. 31 is a side view of an evaporator according to still another presently-preferred embodiment of an aspect of the invention.
Figure 32:
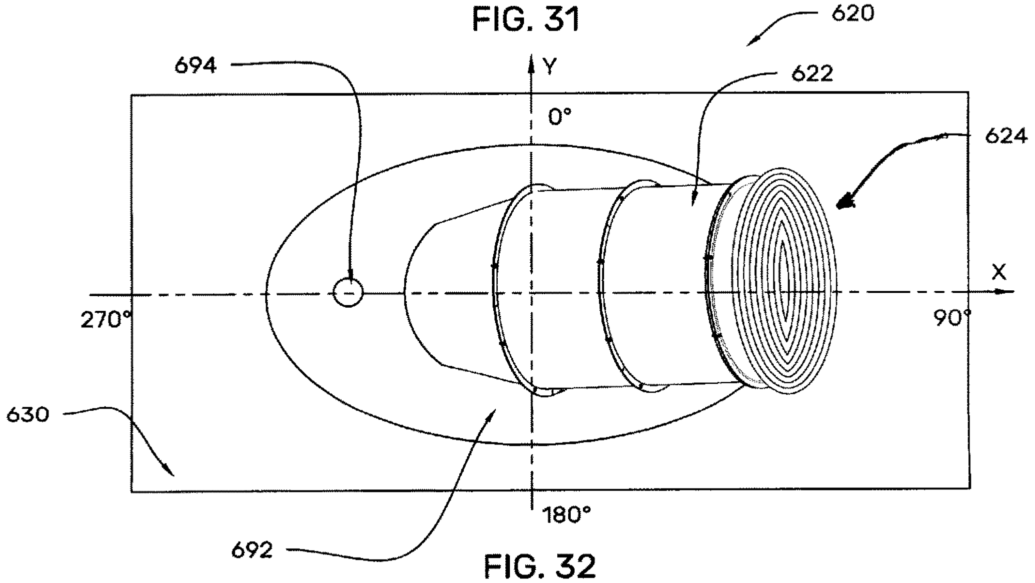
FIG. 32 is a top view of the evaporator of FIG. 31.

As an example, an evaporator 620 is shown from a side perspective in FIG. 31 and a top view in FIG. 32. Evaporator 620 is identical in essentially all of its design features and construction except that housing 622 is disposed at an angle β with respect to the plane of the water surface that is less than 90 degrees. To be clear, for each angular position of the housing other than the orthogonal position at 90 degrees, the housing in three dimensions forms a range of angles with respect to the plane of the water surface, and the angle β refers to the minimum of those angles. As shown in FIG. 32, for example, for purposes of analysis and illustration one may impose a reference circle around the base of housing 622, and one may demarcate angular positions in the plane in which the circle lies in degrees, with 0 degrees lying on the positive y axis, 90 degrees being at the positive x axis, and so on. One also may overlay a rectilinear coordinate system centered (having its origin) at the intersection of the longitudinal axis L and the plane of the float assembly upon which the housing is disposed.

In this system, the x axis runs along the length of the float assembly 630, the y axis runs along the width of float assembly 630 orthogonally with respect to the x axis, and the z axis is mutually orthogonal with respect to the x and y axes. Also in this system, the longitudinal axis of housing 622 is tilted toward the x axis, 90 degrees on the radial measure around the circle and, as shown in FIG. 31, it makes an angle of β the respect to the plane of the float assembly, and of the water surface, at the radial position of 90 degrees, as shown in FIG. 31. Correspondingly, the longitudinal axis L of housing 622 makes a complimentary angle, designated in FIG. 31 as Greek letter sigma δ, of 180 degrees minus β. Indeed, with the housing fixed at the 90-degree radial position, one may go around the circle and designate a locus of primary and complimentary angles. Of the theoretically infinite number of angles in this locus, the minimum angle lies at the radial angle of the tilt of the housing, i.e., here angle β, and the maximum is complimentary angle δ. When reference is made in this document to the angle or tilt angle of the housing, it refers to this minimum angle β.

In certain applications one may find advantage in having an angled or tilted housing. When the evaporator is at a location for which it would be problematic or otherwise undesirable to have the air flow stream pointed out one or more sides of the evaporator, for example, because of an obstruction, a sensitive area, an area populated by workers, etc., one may wish for the evaporator to direct the air flow stream in directions other than those. By tilting the evaporator housing, this can direct the outputted air flow stream in the direction opposite the tilt, thereby efficiently evaporating the water but while preserving the protected areas.

Housing pitch angles β may range on the low side to essentially zero, which would be equivalent to directing the air flow stream on or parallel to water surface 18*a*. As a practical limit in some applications, however, it may not be convenience to provide the evaporator housing at such an acute angle. As the angle β is increased from near zero, the direct impact effect of the air stream on the water surface will increase. In contrast, when the housing angle β is near 90 degrees and the housing is essentially perpendicular with respect to water surface 18*a*, there will be relatively little directionality of the air flow stream. As one reduces the housing angle β downwardly from 90 degrees, directionality will increase. At housing angles in between these regions, one can obtain attractive direct impact water droplet formation features with increasing directionality by balancing the angle β between these two outer limits. In presently preferred embodiments, the housing angle may be between about 15 to 25 degrees on the lower side to about 60 to 75 degrees on the upper side. More preferred ranges of angles within this larger range are from about 45 to about 90 degrees, and in many applications from about 45 to about 60 degrees, which provides a nice balance. Although these ranges are useful in many applications, they are not necessarily limiting.

It should be noted that another approach to directionality of the output from the evaporator would include selectively closing one or more of the float channels or float channel exits.

In evaporator 620, housing 622 is disposed on a rotatable table 692 rotatably disposed in the top surface of flat assembly 630 so that it can rotate 360 degrees radially, as shown in FIG. 32. An adjustment bolt 694 is located on table 692 so that, when bolt 694 is loosened the table is free to rotate but when housing 622 is in the desired position, bolt 694 can be tightened to lock table 692 into radial position. An adjustable support 696 is provided at the opposite side of housing 622 to support the housing with respect to the float assembly 630, and also to allow adjustment of the tilt angle β, e.g., by extending or retracting the support 696.

In each of the presently-preferred embodiments described herein above, the housing flow channel, which is positioned along longitudinal axis L, is substantially perpendicular with respect to the surface of the water 18*a* and with respect to the float assembly, assuming the water is relatively quiescent and the float assembly is not being rocked or moved by wave action. This is not, however, necessarily limiting.

As described herein above, float assembly flow channel exits 332*t* of evaporator 320, for example, are open and the wet air is able to flow freely and directly out of these channel openings or exits. Alternatively, however, one may dispose vents, directional gratings, flow modifiers or restrictors or the like at these channel ends as desired or to support a particular application or operational requirement. Venting or directing the wet air upwardly away from the surface of the water, for example, can cause of enhance an airborne plume, which in turn may be used to take better advantage of potentially dryer and faster moving air that is vertically more distant from the water surface than that lying at or just above the water surface.

Presently-preferred evaporators, systems and methods for evaporating water from a water body as disclosed herein have been described as comprising an electric motor that drives an impeller to move air through the housing air flow channel and float channels. In many practical applications, the load on the motor is not uniform. Moreover, in many applications it is desirable or even necessary to adjust the air flow parameters, for example, such as the air flow velocity, the volumetric flow rate, and so on. Operating the impeller or other air flow induction device using an electric motor often can be done more efficiently or even optimally by adjusting the operational characteristics of the motor, such as torque and rotational speed.

In accordance with another aspect of the invention, evaporators and related systems and methods comprise a variable power or variable speed controller. Examples of variable power or variable speed controllers may include rheostats, L-pads, motor speed control boxes, mechanical variable speed transmissions, variable speed or variable frequency drives, voltage controllers, current controllers, digital controllers and other means known in the motor industry. In evaporator 320, the presently-preferred variable power or speed controller comprises a variable frequency drive 390 as shown in FIG. 8, and in evaporator 420, the presently-preferred variable power or speed controller comprises a variable frequency drive 490, as shown in FIG. 21. The variable power or speed controller as a general matter may be disposed at or on the evaporator, at or on a shore location, e.g., such as on apron 14*a* in FIG. 1, at an intermediate location, e.g., such as on a floating facility, a boat, a barge, or the like, or at other locations. In the case of evaporators 320 and 420, and preferably but optionally, the variable power or speed controller is disposed at a location on apron 14*a*, for example, near to a power source such as a commercial power distribution panel, a generator set, or the like. An example of this would be to house the variable power or speed controller in a utility building or shed 392, as shown in FIG. 1. Electrical power would be supplied, for example, by a power conduit 394 such as a three-phase electrical wire set of suitable gauge and with appropriate casing or shielding for this aqueous environment extending from the variable power or speed controller to the evaporator and more specifically to the motor of the evaporator.

Having described multiple illustrative presently-preferred embodiments and method implementations, one of ordinary skill in the art will appreciate that certain variations and modifications may be made relative to the specific embodiments and methods expressly provided herein. Additional advantages and modifications will readily occur to those skilled in the art. Therefore, the invention in its broader aspects is not limited to the specific details, representative devices and methods, and illustrative examples shown and described. Accordingly, departures may be made from such details without departing from the spirit or scope of the general inventive concept as defined by the appended claims and their equivalents.

What is claimed is:

1. An evaporator for evaporating water from an ambient body of water having a water surface and into an ambient air environment, the evaporator comprising:

a housing comprising a proximal end proximate to the water surface, a distal end distal to the water surface, and a housing air flow channel directed toward the water surface;

a support that positions the housing above the water surface; and an air flow induction device disposed to direct an air flow stream from the distal end toward the proximal end through the housing air flow channel and toward the water surface so that the air flow stream is directed over and along the water surface outside the support, outwardly away from the evaporator and into the ambient air environment.

2. An evaporator as recited in claim 1, wherein the housing is disposed relative to the water surface so that the air flow stream directly contacts the water surface and generates a water droplet containing phase above the water surface.

3. An evaporator as recited in claim 1, wherein the support comprises a support air flow channel in fluid communication with the housing air flow channel to receive the air flow stream and to direct the air flow stream over and along the water surface outwardly away from the evaporator and into the ambient air environment.

4. An evaporator as recited in claim 1, wherein the support comprises a plurality of support air flow channels in fluid communication with the housing air flow channel to receive the air flow stream and to direct the air flow stream over and along the water surface outwardly away from the evaporator and into the ambient air environment.

5. An evaporator as recited in claim 1, wherein:

the support comprises a support air flow channel in fluid communication with the housing air flow channel to receive the air flow stream and to direct the air flow stream over and along the water surface outwardly away from the evaporator and into the ambient air environment; and the evaporator further comprises a water injection device disposed to provide the water to the air flow stream and to mix the water within the air flow stream within the support air flow channel.

6. An evaporator as recited in claim 1, wherein:

the support comprises a support air flow channel in fluid communication with the housing air flow channel to receive the air flow stream and to direct the air flow stream over and along the water surface outwardly away from the evaporator and into the ambient air environment; and the evaporator further comprises a plurality of water injection devices disposed to provide the water to the air flow stream and to mix the water within the air flow stream within the support air flow channel.

7. An evaporator as recited in claim 6, wherein the water injection devices are distributed along the support air flow channel to provide water to the air flow stream within the support air flow channel.

8. An evaporator as recited in claim 1, wherein:

the support comprises a support air flow channel in fluid communication with the housing air flow channel to receive the air flow stream, the support air flow channel comprising an exit from which the air flow stream is exhausted from the support air flow channel to the ambient air environment; and the evaporator further comprises a water injection device disposed at the support air flow channel exit to provide the water to the air flow stream and to mix the water within the air flow stream.

9. An evaporator as recited in claim 1, wherein the housing comprises an inlet air gap within the housing air flow channel and proximate to the distal end of the housing that permits the flow of air into the housing air flow channel through the inlet air gap.

10. An evaporator as recited in claim 1, wherein air flow induction device comprises an impeller comprising a fiberglass material.

11. An evaporator as recited in claim 1, wherein air flow induction device comprises an impeller consisting essentially of a fiberglass material.

12. An evaporator as recited in claim 11, further comprising:

an electric motor operatively coupled to the impeller to drive the impeller; and a variable frequency drive operatively coupled to the motor.

13. An evaporator as recited in claim 1, further comprising a plurality of guide vanes disposed downstream of the air flow induction device.

14. An evaporator as recited in claim 1, further comprising:

an electric motor operatively coupled to the air flow induction device to drive the air flow induction device; and a controlled variable power supply operatively coupled to the motor that causes the motor to assume a plurality of designated speeds.

15. An evaporator as recited in claim 1, wherein the housing air flow channel is disposed perpendicularly with respect to the water surface.

16. An evaporator as recited in claim 1, wherein the housing air flow channel is disposed non-perpendicularly with respect to the water surface.

17. An evaporator for evaporating water from an ambient body of water having a water surface, the evaporator comprising:

a housing comprising a proximal end proximate to the water surface, a distal end distal to the water surface, and a housing air flow channel that directs an air flow stream from the distal end to the proximal end toward an impact zone at the water surface;

a support that positions the housing above the water surface, the support comprising an opening at the impact zone; and an air flow induction device disposed to direct the air flow stream through the housing air flow channel and to the impact zone so that the air flow stream impacts the water surface at the impact zone, generates a water droplet-containing phase above the water surface, and directs the air flow stream and the water droplet-containing phase over and along the water surface outside the support, outwardly away from the evaporator and into the ambient air environment.

18. An evaporator as recited in claim 17, wherein:

the support comprises a support air flow channel in fluid communication with the housing air flow channel to receive the air flow stream and to direct the air flow stream over and along the water surface; and the evaporator further comprises at least one water injection device disposed to provide the water to the air flow stream and to mix the water within the air flow stream within the support air flow channel.

19. An evaporator as recited in claim 17, wherein:

the support comprises a support air flow channel in fluid communication with the housing air flow channel to receive the air flow stream and to direct the air flow stream over and along the water surface, the support air flow channel comprising an exit from which the air flow stream is exhausted from the support air flow channel to the ambient air environment; and the evaporator further comprises a water injection device disposed at the support air flow channel exit to provide the water to the air flow stream and to mix the water within the air flow stream at the air flow channel exit.

20. An evaporator as recited in claim 17, wherein the air flow induction device comprises an impeller comprising a fiberglass material.

21. An evaporator as recited in claim 17, wherein the air flow induction device comprises an impeller consisting essentially of a fiberglass material.

22. An evaporator as recited in claim 17, further comprising a plurality of guide vanes disposed downstream of the air flow induction device.

23. An evaporator as recited in claim 17, further comprising:

an electric motor operatively coupled to the air flow induction device to drive the air flow induction device; and a variable frequency drive operatively coupled to the motor.

24. A method for evaporating water from an ambient body of water having a water surface and into an ambient air environment, the method comprising:

providing an evaporator comprising a housing having a proximal end proximate to the water surface, a distal end distal to the water surface, and a housing air flow channel directed toward the water surface;

directing air from the distal end of the housing toward the proximal end of the housing through the housing air flow channel and toward the water surface so the air is directed over and along the water surface outside the evaporator, outwardly away from the evaporator and into the ambient air environment.

* * * * *